US012591359B2

(12) United States Patent
Yoon et al.

(10) Patent No.: US 12,591,359 B2
(45) Date of Patent: Mar. 31, 2026

(54) ELECTRONIC DEVICE COMPRISING DISPLAY THAT OPTIMALLY DISPLAY CONTENT WITH RESPECT TO CAMERA HOLE, AND METHOD FOR CONTROLLING DISPLAY THEREOF

(71) Applicant: Samsung Electronics Co., Ltd., Suwon-si (KR)

(72) Inventors: Youngkwon Yoon, Suwon-si (KR); Kyeongeun Lee, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 18/156,185

(22) Filed: Jan. 18, 2023

(65) Prior Publication Data

US 2023/0152957 A1 May 18, 2023

Related U.S. Application Data

(63) Continuation of application No. PCT/KR2021/007569, filed on Jun. 16, 2021.

(30) Foreign Application Priority Data

Jul. 20, 2020 (KR) ........................ 10-2020-0089799

(51) Int. Cl.
| | |
|---|---|
| *G06F 3/04845* | (2022.01) |
| *G06F 1/16* | (2006.01) |
| *G09G 3/00* | (2006.01) |

(52) U.S. Cl.
CPC ........ *G06F 3/04845* (2013.01); *G06F 1/1686* (2013.01); *G09G 3/035* (2020.08);
(Continued)

(58) Field of Classification Search
None
See application file for complete search history.

(56) References Cited

U.S. PATENT DOCUMENTS

| | | | | |
|---|---|---|---|---|
| 8,286,106 B2 * | 10/2012 | Bergman | .............. | G06F 3/0488 715/802 |
| 9,305,505 B1 | 4/2016 | Seen et al. | | |

(Continued)

FOREIGN PATENT DOCUMENTS

| | | |
|---|---|---|
| CN | 207123683 U | 3/2018 |
| CN | 107885422 A | 4/2018 |

(Continued)

OTHER PUBLICATIONS

International Search Report dated Sep. 17, 2021, issued in International Application No. PCT/KR2021/007569.

(Continued)

*Primary Examiner* — Anh-Tuan V Nguyen
(74) *Attorney, Agent, or Firm* — Jefferson IP Law, LLP

(57) ABSTRACT

An electronic device is provided. The electronic device includes a housing, a display having a display area exposed through the housing and including a camera hole, a camera module positioned between the display and the housing, and positioned in correspondence to the camera hole, a processor connected to the display and the camera module, and a memory coupled to the processor and stores a content group including content. The memory may store instructions that allow the processor, when executed, to display the content in a first area of the display area when the content is of a first size, and the first area may be an area between a first tangent line of the camera hole and a first side of the display area, the first side may be a side that is in parallel to the first tangent line and closest to the first tangent line.

20 Claims, 19 Drawing Sheets

(52) U.S. Cl.
CPC .................. *G09G 2340/045* (2013.01); *G09G 2340/0464* (2013.01); *G09G 2354/00* (2013.01)

(56) References Cited

U.S. PATENT DOCUMENTS

| | | | |
|---|---|---|---|
| 9,607,567 B2 | 3/2017 | Seen et al. | |
| 9,645,663 B2 | 5/2017 | Mavrody | |
| 9,736,383 B2 * | 8/2017 | Evans, V | H04M 1/0264 |
| 9,767,728 B2 | 9/2017 | Evans, V et al. | |
| 9,799,276 B2 | 10/2017 | Seen et al. | |
| 10,062,322 B2 | 8/2018 | Evans, V et al. | |
| 10,070,030 B2 | 9/2018 | Evans, V et al. | |
| 10,324,492 B2 | 6/2019 | Pantel | |
| 10,424,272 B2 | 9/2019 | Yoon et al. | |
| 10,429,905 B2 | 10/2019 | Lee et al. | |
| 10,530,911 B2 | 1/2020 | Bao | |
| 10,607,573 B2 | 3/2020 | Silvanto et al. | |
| 10,736,042 B2 | 8/2020 | Lee et al. | |
| 10,877,520 B2 | 12/2020 | Kim et al. | |
| 10,948,949 B2 | 3/2021 | Lee et al. | |
| 11,023,001 B2 | 6/2021 | Lim et al. | |
| 11,095,762 B2 | 8/2021 | Onyekwelu | |
| 11,304,142 B2 | 4/2022 | Lee et al. | |
| 11,422,587 B2 | 8/2022 | Lim et al. | |
| 11,521,577 B2 | 12/2022 | Silvanto et al. | |
| 11,521,579 B2 | 12/2022 | Silvanto et al. | |
| 11,823,645 B2 | 11/2023 | Silvanto et al. | |
| 11,930,130 B2 | 3/2024 | Zhou | |
| 2010/0235732 A1 * | 9/2010 | Bergman | G06F 3/0488 715/702 |
| 2014/0289668 A1 | 9/2014 | Mavrody | |
| 2016/0378334 A1 * | 12/2016 | Liu | G06F 3/04886 715/794 |
| 2017/0126979 A1 * | 5/2017 | Evans, V | H04M 1/0264 |
| 2018/0017996 A1 * | 1/2018 | Ryu | G06F 1/1643 |
| 2018/0219987 A1 | 8/2018 | Pantel | |
| 2018/0316784 A1 | 11/2018 | Bao | |
| 2018/0348992 A1 * | 12/2018 | Ku | G06F 3/04847 |
| 2019/0004687 A1 * | 1/2019 | Gajulapally | G06F 1/1686 |
| 2019/0012008 A1 * | 1/2019 | Yoon | G06F 1/1652 |
| 2019/0043452 A1 | 2/2019 | Silvanto et al. | |
| 2019/0244560 A1 | 8/2019 | Lee et al. | |
| 2019/0281154 A1 * | 9/2019 | Choi | G06F 3/0486 |
| 2020/0042038 A1 | 2/2020 | Lim et al. | |
| 2020/0128119 A1 | 4/2020 | Onyekwelu | |
| 2020/0233568 A1 * | 7/2020 | Wang | G06F 3/04845 |
| 2021/0043695 A1 * | 2/2021 | Wang | H10K 59/353 |
| 2021/0096602 A1 | 4/2021 | Kim et al. | |
| 2021/0210581 A1 * | 7/2021 | Ma | H10K 59/121 |
| 2022/0030105 A1 * | 1/2022 | Zhou | H04M 1/724 |
| 2022/0357767 A1 | 11/2022 | Lim et al. | |

FOREIGN PATENT DOCUMENTS

| | | |
|---|---|---|
| CN | 108494964 A | 9/2018 |
| CN | 110416275 A | 11/2019 |
| CN | 110663016 A | 1/2020 |
| JP | 2019-503500 A | 2/2019 |
| KR | 10-2017-0062327 A | 6/2017 |
| KR | 10-2018-0097384 A | 8/2018 |
| KR | 10-1927438 B1 | 12/2018 |
| KR | 10-2019-0065072 A | 6/2019 |
| KR | 10-2020-0112303 A | 10/2020 |
| WO | 2020-063605 A1 | 4/2020 |

OTHER PUBLICATIONS

Extended European Search Report dated Feb. 27, 2024, issued in European Patent Application No. 21846799.1-1224.

Korean Office Action with English translation dated Jan. 20, 2025; Korean Appln. No. 10-2020-0089799.

\* cited by examiner

400

401

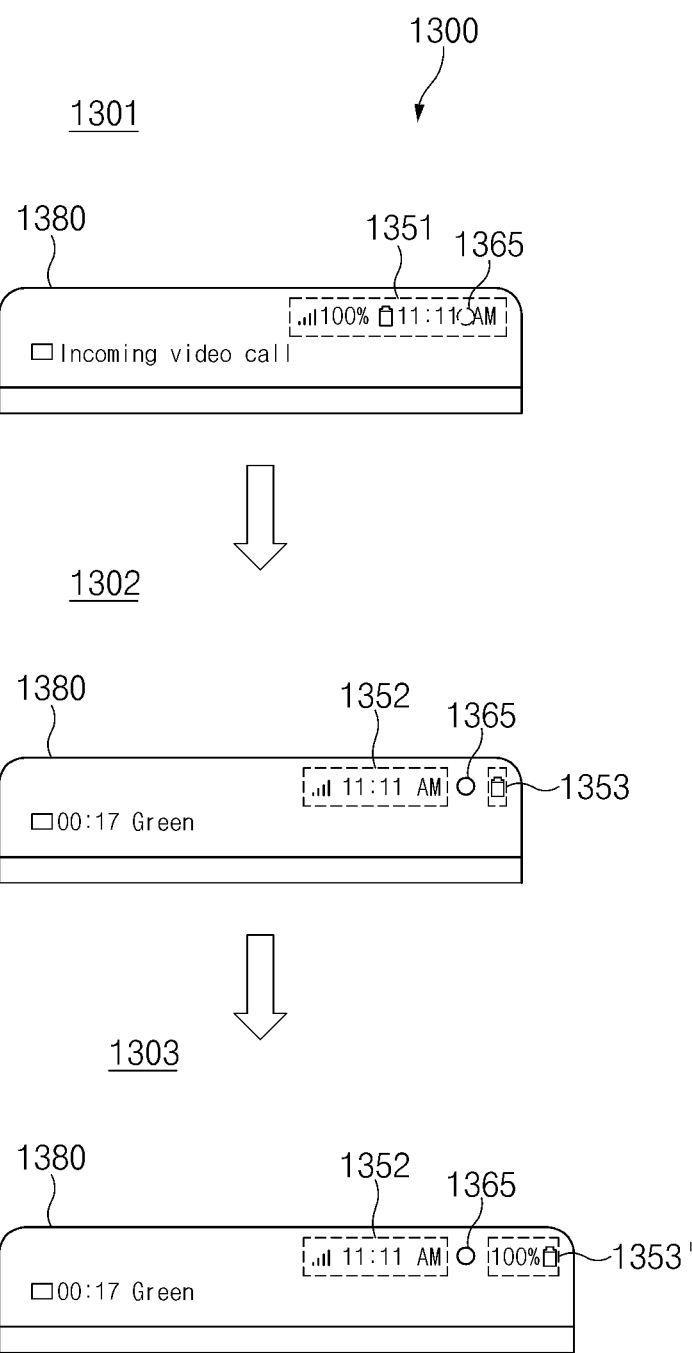
F I G . 13

ELECTRONIC DEVICE COMPRISING DISPLAY THAT OPTIMALLY DISPLAY CONTENT WITH RESPECT TO CAMERA HOLE, AND METHOD FOR CONTROLLING DISPLAY THEREOF

CROSS-REFERENCE TO RELATED APPLICATION(S)

This application is a continuation application, claiming priority under § 365(c), of an International application No. PCT/KR2021/007569, filed on Jun. 16, 2021, which is based on and claims the benefit of a Korean patent application number 10-2020-0089799, filed on Jul. 20, 2020, in the Korean Intellectual Property Office, the disclosure of which is incorporated by reference herein in its entirety.

BACKGROUND

1. Field

The disclosure relates to an electronic device including a display and a method for controlling a display thereof More particularly, the disclosure relates to an electronic device that may provide a display area that is close to a full screen by optimally disposing a user interface (UI) displayed on a display including a camera hole, and a method for controlling a display thereof

2. Description of Related Art

To secure a wider display area of a display, an electronic device, in which sensors exposed through a surface that is substantially the same as the display area of the display are disposed under the display, has been developed. For example, the display of the electronic device may have a notch structure, in which a peripheral portion thereof is recessed in various shapes. In the notch display, because sensors may be disposed in an area corresponding to the recessed portion (notch) and a screen may be further displayed on opposite sides of the recessed portion, the display may be wider than that of a display of the related art.

As another example, the display of the electronic device may have a structure, in which a hole is formed at one end of the display area. The display of the structure may be referred to as a hall in display (HID) or a punch hole display. The punch hole display has a wider display area than the notch display, and a full screen effect may be maximized as a size of the hole becomes smaller or a location of the hole is closer to a periphery of the display.

The above information is presented as background information only to assist with an understanding of the disclosure. No determination has been made, and no assertion is made, as to whether any of the above might be applicable as prior art with regard to the disclosure.

SUMMARY

In a structure (e.g., the punch hole display), in which a hole is formed at one end of a display area of a display, a status bar icon and the like may be displayed on a lateral side of the display hole, and a technology for reducing the size of the hole and disposing the hole at a location that is close to a periphery of the display to decrease an area, in which the status bar icon and the like are displayed, and increase a main display area.

Aspects of the disclosure are to address at least the above-mentioned problems and/or disadvantages and to provide at least the advantages described below. Accordingly, an aspect of the disclosure is to provide an electronic device that may provide a display area that is close to a full screen by optimally disposing a user interface (UI) displayed on a display including a camera hole, and a method for controlling a display thereof.

Additional aspects will be set forth in part in the description which follows and, in part, will be apparent from the description, or may be learned by practice of the present embodiments.

In accordance with an aspect of the disclosure, an electronic device is provided. The electronic device includes a housing, a display, a display area of which is exposed through the housing, and including a camera hole, a camera module located between the display and the housing, and located to correspond to the camera hole, at least one processor operatively connected to the display and the camera module, and a memory operatively connected to the processor, and configured to store at least one content group including at least one content, the memory may store instructions that, when executed, cause the processor to display the content in a first area of the display area when a size of the content is a first size, wherein the first area is an area between a first tangent of the camera hole and a first side of the display area, and wherein the first side is one of four sides of the display area, which is closest to the first tangent while being parallel to the first tangent.

In accordance with another aspect of the disclosure, an electronic device is provided. The electronic device includes a housing, a display, a display area of which is exposed through the housing, and disposed to be movable, a camera module located between the display and the housing, at least one processor operatively connected to the display and the camera module, and a memory operatively connected to the processor, and configured to store at least one content group including at least one content, wherein the memory may store instructions that, when executed, cause the processor to identify movement of the display, identify a size and a location of the display area, which are changed according to the movement of the display, and display the at least one content in a first area, based on the changed size and location of the display area, wherein the first area is an area between a first tangent of an area corresponding to a location of the camera module and a first side of the display area, and wherein the first side is one of four sides of the display area, which is closest to the first tangent while being parallel to the first tangent.

In accordance with another aspect of the disclosure, a method for controlling a display of an electronic device including a display including a camera hole is provided. The method includes an operation of receiving a request for displaying a content on the display, an operation of identifying a size of the content, and an operation of displaying the content in any one of, in a display area of the display, a first area, and an area other than the first area based on the size of the content, the first area is an area between a first tangent of the camera hole and a first side of the display area, and the first side may be, among the four sides of the display area, a side that is closest to the first tangent while being parallel to the first tangent.

According to various embodiments disclosed in the disclosure, the electronic device may provide a display area that is close to a full screen by controlling disposition of an UI displayed on a display based on a size and/or a location of a camera hole of a display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 is a view illustrating a method for displaying a content based on a location of a camera hole when a camera module becomes active, by an electronic device according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
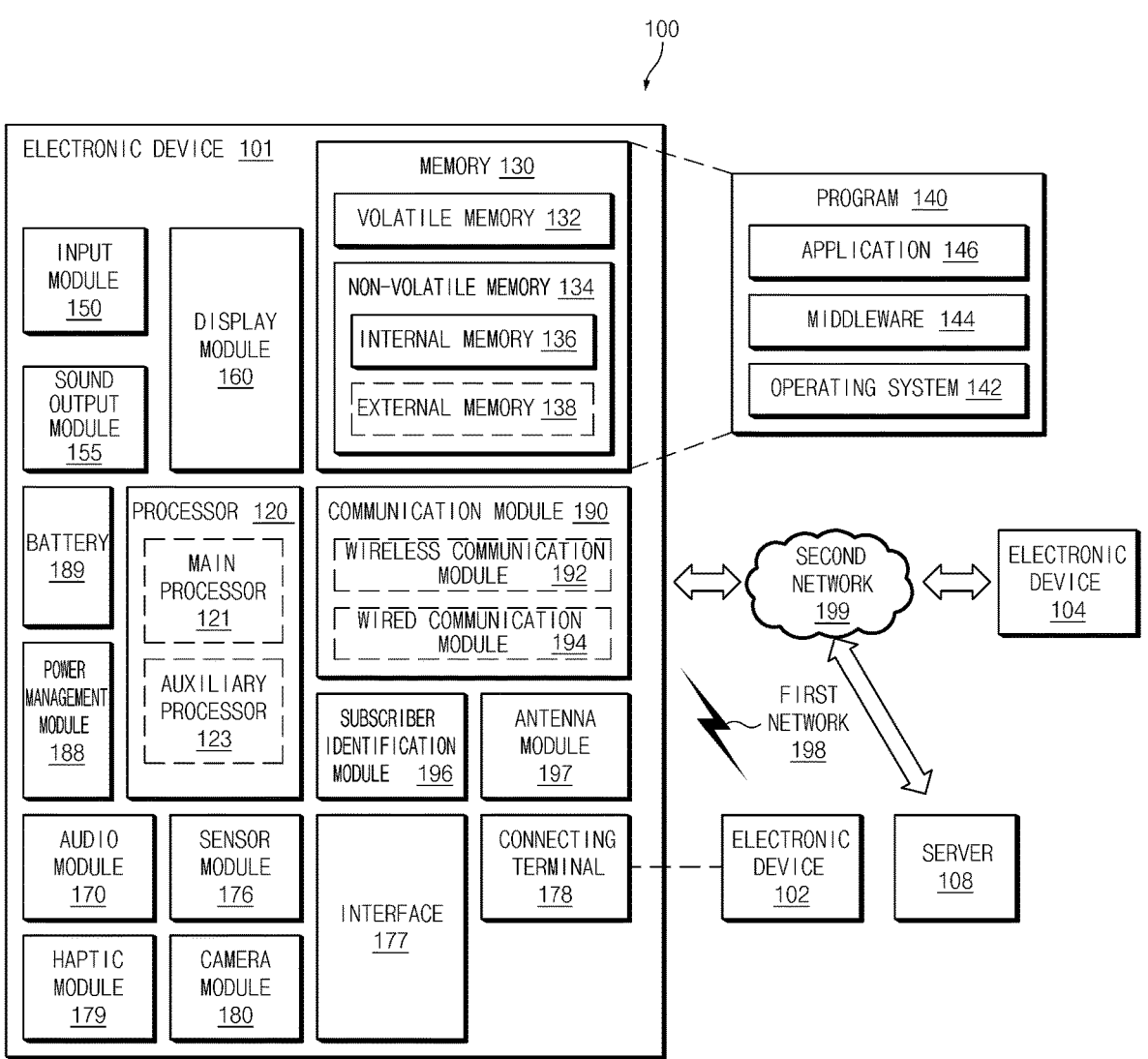
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the displays, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Hereinafter, referring to FIGS. 2 and 3, a size and/or a location of a camera hole of an electronic device (e.g., the electronic device 101 of FIG. 1) according to an embodiment will be described.

Figure 2:
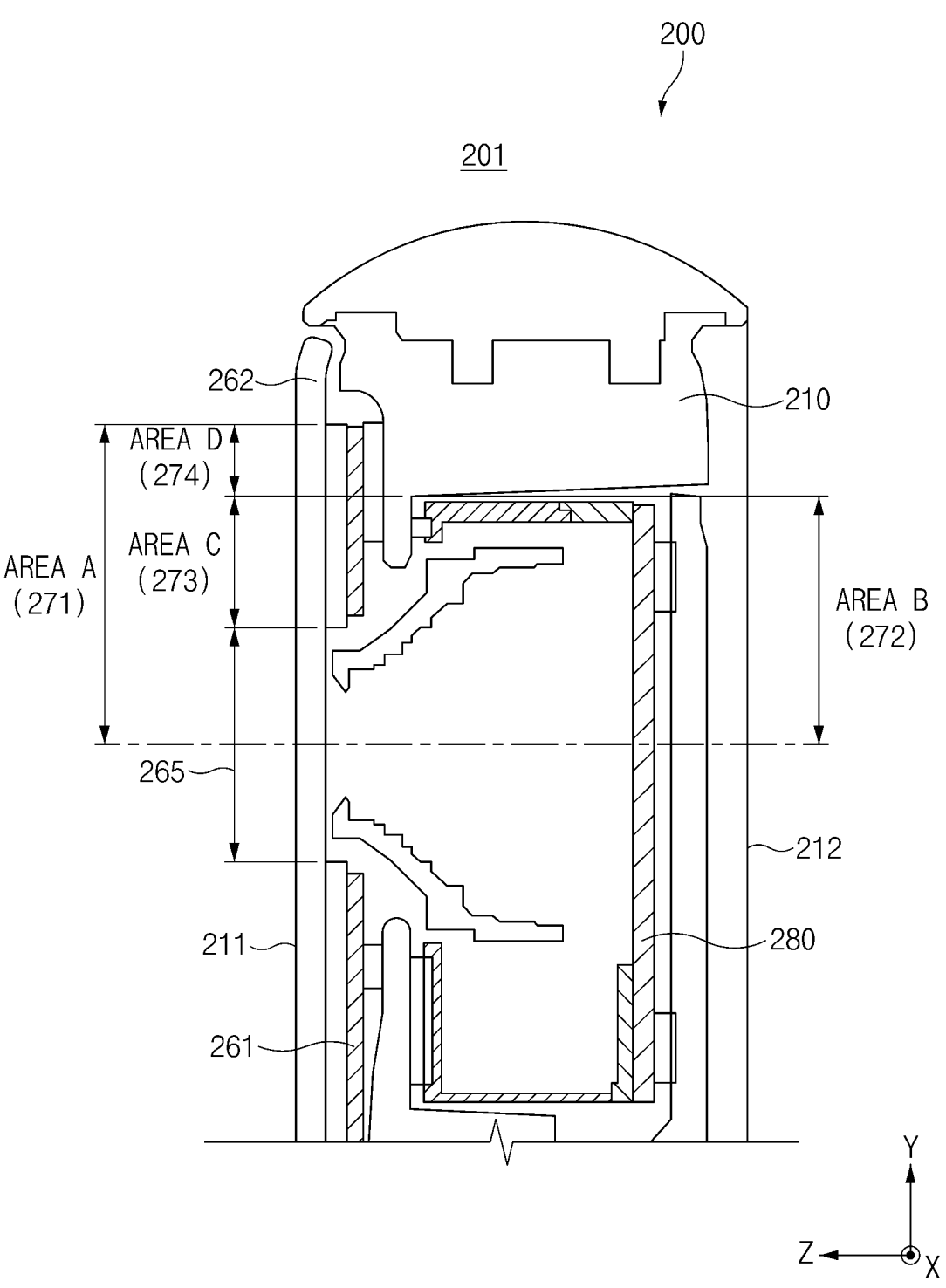
FIG. 2 is a view illustrating a side surface of an electronic device according to an embodiment of the disclosure.

FIG. 2 is a view 200 illustrating a side surface of an electronic device according to an embodiment of the disclosure.

Referring to FIG. 2, an electronic device 201 according to an embodiment may include a housing 210, a cover 262, a display panel 261, and a camera module 280 (e.g., the camera module 180 of FIG. 1).

According to an embodiment of the disclosure, the housing 210 may include a first surface 211 of the electronic device 201, and a second surface 212 that is an opposite surface to the first surface. Referring to FIG. 2, the first surface 211 of the electronic device 201 may mean a surface that faces a positive direction of the z axis, and the second surface 212 of the electronic device 201 may mean a surface that faces a negative direction of the z axis. The first surface 211 and the second surface 212 may be surfaces that face opposite directions while being substantially parallel to each other. According to an embodiment of the disclosure, the first surface 211 of the electronic device 201 may be a front surface of the electronic device 201, and the second surface 212 of the electronic device 201 may be a rear surface of the electronic device 201.

The cover 262 and the display panel 261, which will be described below, may be included in the display module 160 of FIG. 1.

According to an embodiment of the disclosure, the cover 262 may occupy the first surface 211 of the electronic device 201. According to an embodiment of the disclosure, a central portion of the cover 262 may include a flat surface and a periphery thereof may include a curved surface. A display area of the display may be exposed through at least a portion of the central portion of the cover 262. In the disclosure, the display area of the display may mean an area, in which an image is output (displayed) on the display. A peripheral portion of the cover 262 may be coupled to the housing 210. Accordingly, the display area of the display may be exposed through the housing 210. According to an embodiment of the disclosure, the cover 262 may include a glass layer. For example, the cover 262 may include ultra thin glass (UTG). In another embodiment of the disclosure, the cover 262 may include a polymer. In this case, the cover 262 may include polyethylene terephthalate (PET) or polyimide (PI). In an embodiment of the disclosure, a plurality of covers 262 may be disposed. For example, one layer (e.g., an upper surface) of the plurality of covers 262 may be disposed by an adhesive that has a weaker adhesion force or a smaller thickness than an adhesive of another layer to be easily separated from the other layer. In another embodiment of the disclosure, the cover 262 may further include various coating layers formed at least a portion of at least one of an upper surface, a lower surface, and/or side surfaces thereof According to an embodiment of the disclosure, the display panel 261 may be disposed under the cover 262. In other words, the display panel 261 may be disposed in an interior of the housing 210, and may be disposed between the cover 262 and the housing 210 corresponding to the second surface 212 of the electronic device 201.

According to an embodiment of the disclosure, the display panel 261 may include an active area (not illustrated), and an inactive area (not illustrated) that surrounds at least a portion of the active area. A plurality of organic light-emitting diodes, for example, may be arranged in the active area, and accordingly, a plurality of pixels may be formed. In the disclosure, the active area may correspond to the display area of the display. No pixel is formed in the inactive area, and for example, an integrated circuit or a wiring line for applying a signal to the display panel 261 may be disposed such that an image may be displayed in the active area. The inactive area also may be referred to as a black matrix (BM) area.

According to an embodiment of the disclosure, the display panel 261 may include a hole 265. According to an embodiment of the disclosure, the hole 265 may be a camera hole. The camera hole may mean that the camera module 280 is mounted at a location corresponding to the hole 265. For example, light irradiated to the first surface 211 of the electronic device 201 may be input to the camera module 280 through the hole 265.

In various embodiments disclosed in the disclosure, it is exemplified that the hole included in the display is the camera hole, but the disclosure is not limited thereto, and the hole may be a hole corresponding to various sensor modules (e.g., the sensor module 176 of FIG. 1) including a proximity sensor or an illumination sensor.

In an embodiment of the disclosure, the display (e.g., the display panel 261) may include a display that is disposed to be slid to provide a screen (e.g., a display screen). For example, the display area (e.g., a display area 380 of FIG. 3) of the electronic device 101 is an area that is visually exposed to output an image, and the electronic device 101 may adjust the display area 380 according to movement of a sliding plate (not illustrated) or movement of the display. For example, a rollable electronic device that is configured to plan to selectively expand the display area 380 as at least a portion (e.g., the housing 210) of the electronic device 101 may be at least partially slid may be included. For example, the display also may be referred to as a slide-out display or an expandable display.

According to an embodiment (not illustrated) of the disclosure, a size and a location of the display area 380 may be changed according to movement of at least a portion of the housing or movement of the display. According to an embodiment of the disclosure, the display area 380 may be divided into two areas according to movement of the display. For example, the display area 380 may be divided into a first display area, a size and/or a location of which is changed when the display is moved, and a second display area, a size and/or a location of which is fixed when the display is moved. For example, as the display is moved in a positive (+) direction of the X axis of FIG. 3 or a positive (+) direction of the Y axis of FIG. 3, the size of the first display area may increase and the location of the first display area may be moved in the positive (+) direction of the X axis and the positive (+) direction of the Y axis.

According to an embodiment of the disclosure, the camera module 280 (e.g., the camera module 180 of FIG. 1) may be disposed in an interior of the housing 210, and may be disposed between the display panel 261 and the housing 210 corresponding to the second surface 212 of the electronic device 201. According to an embodiment of the disclosure, the camera module 280 may be at least partially disposed at a location corresponding to the hole 265 of the display panel 261. The camera module 280 may include an image sensor (not illustrated) and/or an actuator (ACT), and a size of the camera module 280 may be determined according to a size of the image sensor and/or a size of the actuator.

Referring to FIG. 2, an area "A" 271 may correspond to a distance from a center of the camera hole 265 to an upper end of the display panel 261 in a positive (+) direction of the Y axis. An area "B" 272 may correspond to a distance from the center of the camera hole 265 to an upper end of an outskirt of the camera module 280 in a positive (+) direction of the Y axis.

According to an embodiment of the disclosure, a BM area may be located in the "B" 272. Accordingly, an image cannot be output in an area "C" 273 that is an area of the display, which corresponds to (or is related to) the area "B" 272. According to an embodiment of the disclosure, because an area of the area "A" 271, except for an area "D" 274 and the area "C" 273, corresponds to at least a portion of the camera hole 265, an image cannot be output in the area of area "A" 271, except for area "D" 274 and area "C" 273, but the disclosure is not limited thereto. According to an embodiment of the disclosure, an active area may be located in the area "A" 271, except for the area "B" 272. For example, an image may be output at at least a portion of the area "D" 274 that is an area of the display, except for an area corresponding to the area "A" 271, which corresponds to the area "B" 272.

According to an embodiment of the disclosure, the display area of the display may be larger as a size (e.g., an area) of a black matrix (BM) area becomes smaller. Accordingly, as a length of the area "B" 272 that determines a size (e.g., an area or a width) of the BM area decreases, the display area of the display may increase. For example, a decrease in the length of the area "B" 272 may mean that the location (the center of the camera hole 265) of the camera hole 265 is located to be close to an upper end of the display panel 261.

According to the above-description, the length of the area "B" 272 may be different according to the size of the camera module 280, and thus the location of the camera hole 265 may be determined according to the size of the camera module 280. However, because there is a restriction in a size of an image sensor, which determines the size of the camera module 280, and/or an actuator mounting area, it may be difficult to reduce the size of the camera module 280 and thus the length of the area "B" 272 by a specific size or more. Accordingly, the camera hole 265 may be disposed to be spaced apart from an upper end of the display panel 261 by a specific distance or more. According to an embodiment of the disclosure, the length of area "B" 272 may be about 3.5 mm to about 4 mm.

According to an embodiment of the disclosure, the length of the area "B" 272 may be different according to the size of the camera hole 265, the area "C" 273 may be moved in a negative (−) direction of the Y axis as the size of the camera hole 265 becomes smaller, and the area "D" 274 of the display may become larger. According to an embodiment of the disclosure, as the size of the camera hole 265 becomes smaller, a utility thereof as a display area of the area "D" 274 may be enhanced.

According to an embodiment of the disclosure, the size of the camera hole 265 may be determined according to a specification of a lens included in the camera module 280, a structure of an optical system included in the camera module 280, and/or a format of a sensor included in the camera module 280. According to an embodiment of the disclosure, the size (diameter) of the camera hole 265 may be less than about 3 mm.

According to the embodiment of the disclosure illustrated in FIG. 2, the display panel 261 may not be present in an area corresponding to the camera hole 265, but the disclosure is not limited thereto. According to another embodiment of the disclosure, the transparent display panel 261 may be present in the area corresponding to the camera hole 265, and the camera module 280 may be disposed under the display panel 261. The display structure when the area corresponding to the camera hole 265 is empty may referred to as a through-hole structure, and the display structure, in which the area corresponding to the camera hole 265 is a transparent display, may be referred to as an under display camera structure (or a UDC structure).

According to an embodiment of the disclosure, when the electronic device 201 is formed of a rollable display, the location and/or the size of the area "A" 271, the area "B" 272, the area "C" 273, and/or the area "D" 274 may be different as the display (e.g., the display panel 261) is moved (rolled or slid). For example, when the display panel 261 is slid in the positive (+) direction of the Y axis, the area "A" 271 and the area "D" 274 may be increased.

Figure 3:
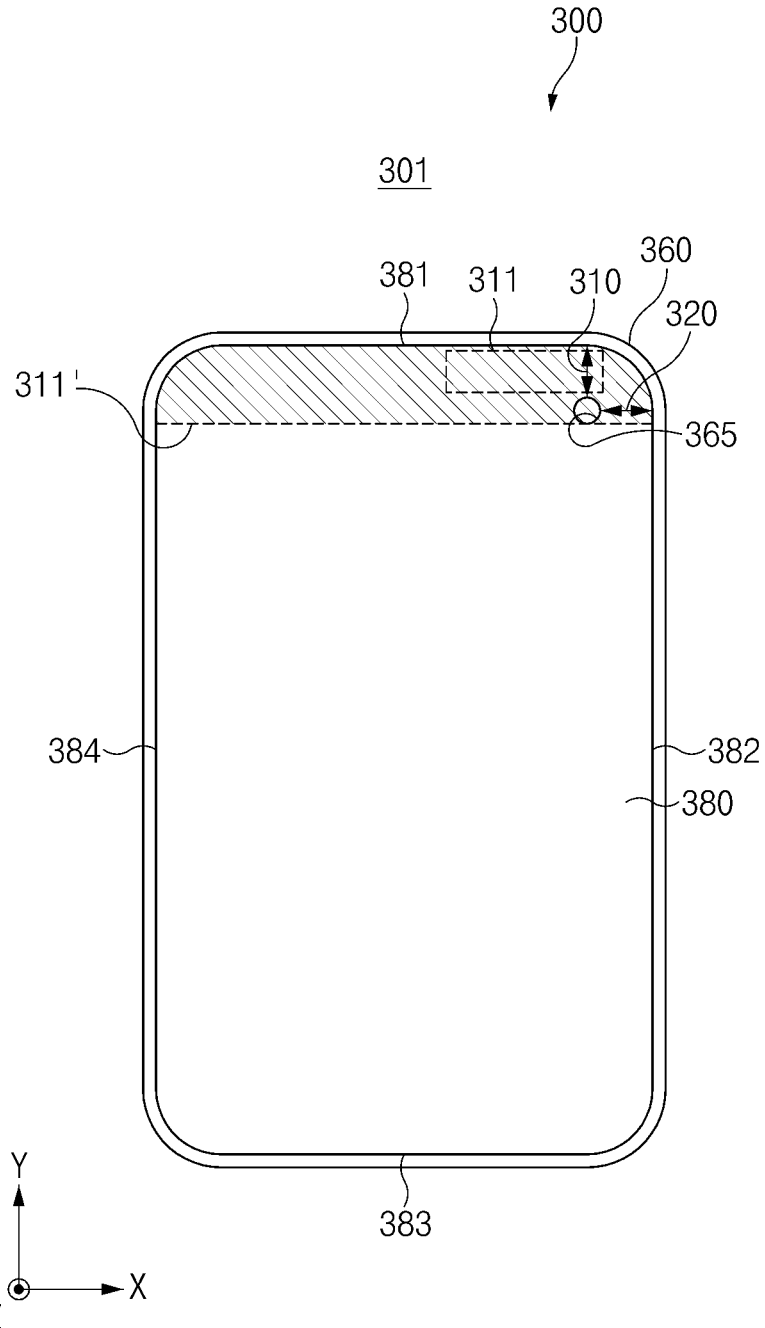
FIG. 3 is a view illustrating a first surface of an electronic device according to an embodiment of the disclosure.

FIG. 3 is a view 300 illustrating a first surface (e.g., the first surface 211 of FIG. 2) of an electronic device (e.g., the electronic device 201 of FIG. 2) according to an embodiment of the disclosure. FIG. 3 is a view illustrating the first surface 211 of the electronic device 201 when viewed in a positive (+) direction of the Z axis.

Referring to FIG. 3, an electronic device 301 according to an embodiment may include a display 360 (e.g., the display module 160 of FIG. 1). According to an embodiment of the disclosure, the display area 380 of the display 360 may be exposed through the housing (e.g., the housing 210 of FIG. 2) of the electronic device 301. According to an embodiment of the disclosure, the display area 380 of the display 360 may be exposed through the first surface of the electronic device 301. As described above with reference to FIG. 2, the display area 380 of the display 360 may correspond to the active area of the display panel 261 of FIG. 2.

The display area 380 may include four sides (a first side 381, a second side 382, a third side 383, and a fourth side 384). According to an embodiment of the disclosure, the first side 381 and the third side 383 may be substantially parallel to each other, and the second side 382 and the fourth side 384 may be substantially parallel to each other. According to an embodiment of the disclosure, the first side 381 and the third side 383 may be connected to the second side 382 and the fourth side 384 by curved lines.

According to an embodiment of the disclosure, the display 360 may include a camera hole 365 (e.g., the camera hole 265 of FIG. 2). According to an embodiment of the disclosure, the camera hole 365 may be inclined to be closer to any one of two sides of the display area 380, which are substantially parallel to each other. The camera hole 365 may be disposed to be close to, among the first side 381 and the third side 383 that are substantially parallel to each other, the first side 381, and may be disposed to be close to, among the second side 382 and the fourth side 384 that are substantially parallel to each other, the second side 382.

According to an embodiment of the disclosure, a peripheral area of the first side 381 may be referred to as an upper end or an upper side of the display area 380, a peripheral area of the third side 383 may be referred to as a lower end or a lower side of the display area 380, a peripheral area of the second side 382 may be referred to as a right end or a right side of the display area 380, and a peripheral area of the fourth side 384 may be referred to as a left end or a left side of the display area 380. Accordingly, the camera hole 365 may be disposed at the right end of the display area 380.

According to the above description, the camera hole 365 may be disposed to be spaced apart from the upper end of the display area 380 by a specific distance or more due to the size of the camera module (e.g., the camera module 280 of FIG. 2). For example, the camera hole 365 may be disposed to be spaced apart from the first side 381 by a specific distance or more.

According to an embodiment of the disclosure, the electronic device 301 may display a status bar including icons that represent statuses of the electronic device 301 at the upper end of the display area 380. According to an embodiment of the disclosure, the status bar may include icons that represent statuses of the electronic device 301, such as a time (a current time), a residual charge of the battery, a Wi-Fi connection status, a communication status, a Bluetooth connection status, an alarm setting status, and/or a message reception status. According to an embodiment of the disclosure, the status bar icons may be updated according to the status of the electronic device 301.

According to various embodiments disclosed in the disclosure, the electronic device 301 may display the status bar icons in a first area 310. For example, the first area may be the area "D" 274 of FIG. 2. According to an embodiment of the disclosure, the first area 310 may be an area between one (e.g., a tangent that is closest to the first side 381) of tangents of the camera hole 365, which is substantially parallel to the first side 381, and the first side 381. For example, the status bar icons may be displayed in a first status bar display area 311. In the embodiment with reference to FIG. 3, the first area 310 may be an upper area of the electronic device 301 with respect to the camera hole 365. The first status bar display area 311 may mean an area of the first area 310, which is adjacent to the camera hole 365.

According to an embodiment of the disclosure, an area, except for the first status bar display area 311, in which a status bar is displayed, may be a main display area of the electronic device 301. The main display area, for example, may mean an area, in which an execution screen of an application executed through an execution input of a user is displayed. Accordingly, because a screen intended by the user cannot be displayed in the first status bar display area 311, in which the status bar is displayed, the area, in which the status bar is displayed, may be referred to a dead zone.

The electronic device 301 according to various embodiments disclosed in the disclosure may minimize a dead zone and maximize a full screen effect by displaying the status bar at least a portion of the first area 310. The electronic device according to various embodiments may display the status bar in the first status bar display area 311, instead of a second status bar display area 311', and thus may further utilize at least a portion of the second status bar display area 311' as the main display area. According to an embodiment of the disclosure, the second status bar display area 311' may be a left area or a right area of the camera hole 365. For example, the left area or the right area of the camera hole 365 may be, among areas between, among two sides of the display area 380, which are substantially parallel to each other, the first side 381 that is close to the camera hole 365, and, among two tangents that are substantially parallel to the first side 381, the tangent that is relatively distant from the first side 381.

In the above-described embodiment of the disclosure, it is exemplified that the electronic device 301 is a portrait mode, but the disclosure is not limited thereto. As another example, when a mode of the electronic device 301 is changed to a landscape mode, in which the electronic device 301 is rotated by a specific angle (e.g., about 90 degrees) in a counterclockwise/clockwise direction with respect to the Z axis, the electronic device 301 may display the status bar icons in a second area 320. A detailed description thereof will be made with reference to FIG. 10.

Hereinafter, referring to FIG. 4, a configuration of an electronic device (e.g., the electronic device 301 of FIG. 3) according to an embodiment of the disclosure, and a method for displaying a content in a first area (e.g., the first area 310 of FIG. 3) and/or a second area (e.g., the second area 320 of FIG. 3) by the electronic device having the configuration will be described.

Figure 4:
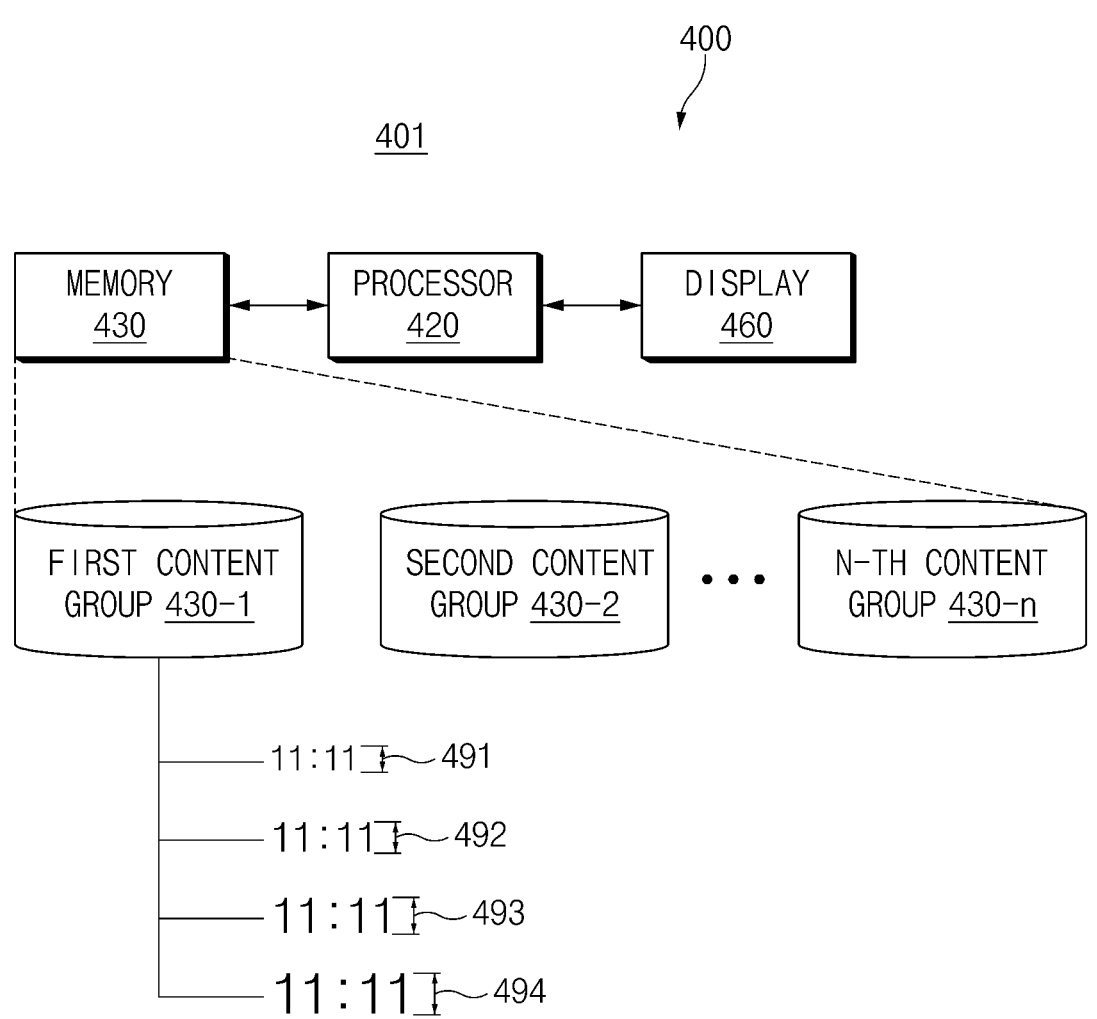
FIG. 4 is a schematic block diagram of an electronic device according to an embodiment of the disclosure.

FIG. 4 is a schematic block diagram 400 of an electronic device according to an embodiment of the disclosure.

Referring to FIG. 4, an electronic device 401 according to an embodiment may include a display 460 (e.g., the display module 160 of FIG. 1 or the display 360 of FIG. 3), a memory 430 (e.g., the memory 130 of FIG. 1), and a processor 420 (e.g., the processor 120 of FIG. 1).

According to an embodiment of the disclosure, a display area (e.g., the display area 380 of FIG. 3) of the display 460 may be exposed through a first surface (e.g., the first surface 211 of FIG. 2) of the electronic device. According to an embodiment of the disclosure, the display 460 may include a camera hole (e.g., the camera hole 365 of FIG. 3). According to an embodiment of the disclosure, when the display 460 is a through hole structure, an area corresponding to the camera hole may be excluded from the display area. According to another embodiment of the disclosure, when the display 460 has a UDC structure, an area corresponding to the camera hole may be included in the display area.

According to an embodiment of the disclosure, the memory 430 may store at least one content group (e.g., a first content group 430-1, a second content group 430-2, . . . , and a n-th content group 430-n). The at least one content group may be one, in which at least one content is grouped for types thereof According to an embodiment of the disclosure, the content may mean information (data) that may be displayed on the display 460. According to an embodiment of the disclosure, the content may include a status bar icon. According to an embodiment of the disclosure, the status bars may be icons that represent statuses of the electronic device 301, and may include at least one of a time (a current time), a residual charge of the battery, a Wi-Fi connection status, a communication status, a Bluetooth connection status, an alarm setting status, and/or a message reception status. According to an embodiment of the disclosure, the content group including the status bar icons may be updated according to the status of the electronic device 401.

According to an embodiment of the disclosure, the status bar icons may be included in different content groups according to the types thereof For example, the first content group 430-1 may include an icon that represents a time (a current time), and the second content group 430-2 may include an icon that represents a residual charge of the battery, but the disclosure is not limited thereto.

According to an embodiment of the disclosure, the content group may include contents of various formats that represent the same information (or data). The formats may include sizes and/or forms. Referring to the embodiment with reference to FIG. 4, the first content group 430-1 including the icon that represents a time (a current time) may include contents (e.g., 11:11) of various sizes of a first size 491, a second size 492, a third size 493, and a fourth size 494. Then, the sizes of the contents may be classified according to heights thereof, but the disclosure is not limited thereto, and they may be classified according to widths thereof Although not illustrated in FIG. 4, according to an embodiment of the disclosure, the first content group 430-1 including the icon that represents a time (a current time) may include contents (e.g., 11:11) in various forms of a first form (e.g., 11:11), a second form (e.g., 11 hour 11 minute), and a third form (e.g., eleven hour and eleven minute).

In the above-described embodiment of the disclosure, it has been exemplified that the electronic device stores at least one content group after the content groups are grouped with reference to the types of the contents (or information represented by the contents), but the disclosure is not limited thereto, and the at least one group may be stored after being grouped with reference to the sizes of the contents. For example, the electronic device may store at least one content of the first size 491 as the first content group 430-1, store at least one content of the second size 492 as the second content group 430-2, and store at least one content of the n-th size as the n-th content group 430-n.

According to an embodiment of the disclosure, the processor 420 may be operatively connected to the display 460 and the memory 430. The processor 420 may select a content that satisfies a specific condition from the at least one content group stored in the memory 430, and may display the selected content on the display 460. The condition may be a default value or a condition of the electronic device 401 regarding the size and/or the form of the status bar icon, but the disclosure is not limited thereto, and may be a value or a condition that is set based on a setting input by the user.

According to an embodiment of the disclosure, when the content is of the first size 491, the processor 420 ma display the content in the first area (e.g., the first area 310 of FIG. 3) of the display 460. According to an embodiment of the disclosure, the first area may be an area between the first tangent of the camera hole (e.g., the camera hole 365 of FIG. 3) and the first side (e.g., the first side 381 of FIG. 3). The first side may be one of four sides of the display area, which is closest to the first tangent while being parallel to the first tangent. According to an embodiment of the disclosure, when the content is of the first size 491, the processor 420 of the electronic device may display the content in the first status bar display area 311. According to an embodiment of the disclosure, the first size 491 may be smaller than the size of the first area. Then, the first size 491 may mean a height of the content, and the size of the first area may mean a distance between the first tangent and the first side.

According to an embodiment of the disclosure, the processor 420 may display the content in the first area when the content is of the first size 491 or less, and may not display the content in the first area when the content is of more than the first size 491. For example, when the content is of more than the first size 491, the content may be displayed in the second status bar display area 311' of FIG. 3. In this case, the second status bar display area 311' of FIG. 3 may be a dead zone.

According to an embodiment of the disclosure, the processor 420 may display the content in the main display area. According to an embodiment of the disclosure, the main display area may mean an area of the display area, except for the area, in which the status bar icon is displayed. The main display area, for example, may be an area, in which an execution screen of at least one application stored in the memory 430 is displayed. According to an embodiment of the disclosure, the memory 430 may store a content group related to an application. Accordingly, according to an embodiment of the disclosure, the processor 420 may display a content included in a content group related to an application stored in the memory 430 in the main display area of the display 460.

According to various embodiments of the disclosure, the electronic device 401 may include the display 460 disposed to be slid, and may identify the size and/or the location of the display area (e.g., the display area 380 of FIG. 3) that is changed according to movement of the display 460. For example, the processor 420 may identify movement (or motion) of the display 460 or at least a portion of the housing (e.g., the housing 210 of FIG. 2) connected to the display 460, through a sensor (e.g., the sensor module 176 of FIG. 1). For example, as the processor 420 identifies whether the display 460 is expanded, it may identify the size and/or the location of the display area 380 based on the size and/or the location of the display area 380 in an expansion mode, and/or the size and/or the location of the display area 380 in a non-expansion mode.

According to an embodiment of the disclosure, the processor 420 may display the at least one content in the first area (e.g., the first area 310 of FIG. 3) based on the size and/or the location of the display area 380 that is changed according to movement of the display 460. According to an embodiment of the disclosure, the processor 420 may set a mode for displaying the at least one content in the first area to the expansion mode or the non-expansion mode, based on a setting input by the user or a default setting value.

For example, when at least one content is set to be displayed in the first area in the expansion mode, the processor 420 may adjust a display location of the content such that the at least one content is displayed in the first area as the size and/or the location of the changed display area 380 is identified as the size and/or the location of the display area 380 in the expansion mode. For example, when at least one content is set to be displayed in the first area in the non-expansion mode, the processor 420 may adjust a display location of the content such that the at least one content is displayed in the first area as the size and/or the location of the changed display area 380 is identified as the size and/or the location of the display area 380 in the non-expansion mode.

Hereinafter, referring to FIG. 5, a structure of software (e.g., the program 140 of FIG. 1) stored in an electronic device (e.g., the electronic device 101 of FIG. 1) according to an embodiment will be described. According to an embodiment of the disclosure, the software may be stored in the memory (e.g., the memory 130 of FIG. 1 or the memory 430 of FIG. 4) of the electronic device.

Figure 5:
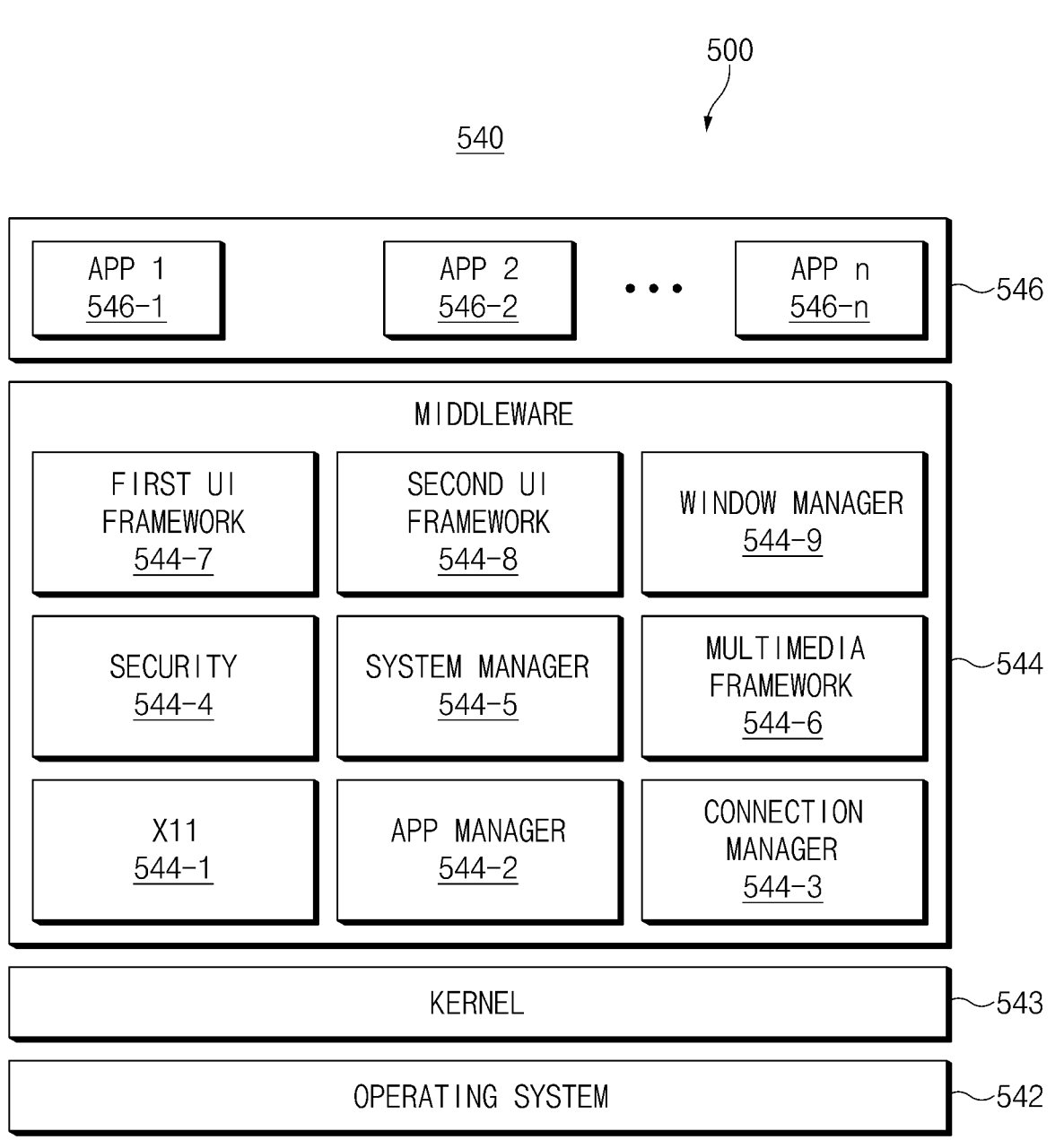
FIG. 5 is a view illustrating a structure of software stored in an electronic device according to an embodiment of the disclosure.

FIG. 5 is a view 500 illustrating the structure of the software stored in an electronic device according to an embodiment of the disclosure.

Referring to FIG. 5, software 540 may include an operating system 542, a kernel 543, middleware 544, and an application 546.

According to various embodiments of the disclosure, the operating system (OS) 542 may function to control and manage an overall operation of hardware. For example, the operating system 542 may be a layer that is in charge of a basic function, such as management of hardware, memory, and security. The operating system 542, for example, may include Android™, iOS™, Windows™, Symbian™, Tizen™, or Bada™.

According to various embodiments of the disclosure, the kernel 543 may include one or more driver programs for driving another hardware device of the electronic device 101, for example, an input module (e.g., the input module 150 of FIG. 1), a sound output module (e.g., the sound output module 155 of FIG. 1), a display module (e.g., the display module 160 of FIG. 1), an audio module (e.g., the audio module 170 of FIG. 1), a sensor module (e.g., the sensor module 176 of FIG. 1), an interface (e.g., the interface 177 of FIG. 1), a haptic module (e.g., the haptic module 179 of FIG. 1), a camera module (e.g., the camera module 180 of FIG. 1), a power management module (e.g., the power management module 188 of FIG. 1), a battery (e.g., the battery 189 of FIG. 1), a communication module (e.g., the communication module 190 of FIG. 1), a subscriber identification module (e.g., the subscriber identification module 196 of FIG. 1), or an antenna module (e.g., the antenna module 197 of FIG. 1). For example, the kernel 543 may deliver various signals including a touch signal detected by the display module (e.g., the display module 160 of FIG. 1) to the middleware 544.

According to various embodiments of the disclosure, the middleware 544 may include various software modules that control an operation of the electronic device. Referring to FIG. 5, the middleware 544 may include an X11 module 544-1, an APP manager 544-2, a connection manager 544-3, a security module 544-4, a system manager 544-5, a multimedia framework 544-6, a first UI framework 544-7, a second UI framework 544-8, and a window manager 544-9.

According to various embodiments of the disclosure, the X11 module 544-1 may receive various event signals from various hardware elements provided in the electronic device. The event may be variously set like an event of detecting a user gesture, an event of generating a system alarm, or an event of executing or finishing a specific application.

According to various embodiments of the disclosure, the APP manager 544-2 may manage execution states of various applications 546 installed in the memory (e.g., the memory 130 of FIG. 1 or the memory 430 of FIG. 4). The APP manager 544-2 may call and execute an application corresponding to an event when an execution event of an application is detected by the X11 module 544-1.

According to various embodiments of the disclosure, the connection manager 544-3 may support a wired or wireless network connection. The connection manager 544-3, for example, may include various detailed modules, such as a DNET module or an UPnP module.

According to various embodiments of the disclosure, the security module 544-4 may support certification, permission, and/or secure storage of hardware.

According to various embodiments of the disclosure, the system manager 544-5 may monitor statuses of the elements in the electronic device, and may provide the monitoring result to another module. The system manager 544-5, for example, may provide the monitoring result on the residual charge of the battery, the communication connection status, or the Bluetooth connection status to the first UI framework 544-7.

According to various embodiments of the disclosure, the multimedia framework 544-6 may reproduce multimedia contents that is stored in the electronic device or provided from an external source. The multimedia framework 544-6 may include a player module, a camcorder module, and/or a sound processing module. Accordingly, the multimedia framework 544-6 may perform an operation of generating and reproducing a screen and a sound on various multimedia contents.

According to various embodiments of the disclosure, the first UI framework 544-7 may provide various UIs that are to be displayed in a status bar display area (e.g., the status bar display area 311 of FIG. 3) of the display (e.g., the display 460 of FIG. 4). According to an embodiment of the disclosure, the status bar display area may be an area, in which status bar icons are displayed. The status bar icons may be generated by the first UI framework 544-7. As described above, the system manager 544-5 may transmit the monitoring result on the status of the electronic device to the first UI framework 544-7. The first UI framework 544-7 may form the monitoring result in a form of a status bar icon, and may display it on the status bar display area (e.g., the status bar display area 311 of FIG. 3) of the display.

According to various embodiments of the disclosure, the second UI framework 544-8 may provide various UIs that are to be displayed in the main display area of the display (e.g., the display 460 of FIG. 4). According to an embodiment of the disclosure, the main display area may be an area, except for the status bar display area (e.g., the status bar display area 311 of FIG. 3). Execution screens of the various applications 546 or a home screen, for example, may be displayed in the main display area. The second UI framework 544-8 may display UIs corresponding to the execution screens of the various applications 546 or the home screen in the main display area of the display.

According to various embodiments of the disclosure, the first UI framework 544-7 and the second UI framework 544-8 may include an image compositor module that constitutes various UI elements, a coordinate compositor module that calculates a coordinate, in which the UI elements are to be displayed, a rendering module that renders the configured UI elements to the calculated coordinate, and a two-dimensional/three-dimensional (2D/3D) UI tool kit that provides a tool for constituting an UI of 2D or 3D. In the disclosure, the UI element also may be referred to as a content or an object.

According to various embodiments of the disclosure, the window manager 544-9 may detect a touch event using a body of the user or a pen, or other input events. The window manager 544-9 may perform an operation corresponding to an event by delivering an event signal to the first UI framework 544-7 or the second UI framework 544-8 when the event is detected.

In addition to the above-described configurations, various program modules, such as a drawing module (not illustrated) that draws a line according to a drawing locus when the user touches or drags the screen, an angle calculating module (not illustrated) that calculates a pitch angle, a roll angle, or a yaw angle based on the detection result detected by a sensor (e.g., a motion sensor) that detects a motion may be included in the middleware 544.

According to various embodiments of the disclosure, the application 546 may include applications 546-1, 546-2, . . . , and 546-n that support various functions. For example, the application 546 may include a program module for providing various services, such as a navigation program module, a game module, an electronic book module, a calendar module, or an alarm management module. The applications may be installed in a default state, and may be arbitrarily installed in a use process by the user.

According to an embodiment of the disclosure, when an UI element corresponding to an application is selected by the user, the processor (e.g., the processor 120 of FIG. 1 or the processor 420 of FIG. 4) may execute an application corresponding to the selected UI element by using the application 546.

The structure of the software illustrated in FIG. 5 simply is an example, and the structure of the software stored in the electronic device is not limited thereto. In various embodiments of the disclosure, a portion of the software may be omitted or modified according to the type or purpose of the electronic device, and may be added.

Hereinafter, referring to FIG. 6, a method for displaying contents in two rows in an area including the first area (e.g., the first status bar display area 311 of FIG. 3) by an electronic device (e.g., the electronic device 401 of FIG. 4) according to an embodiment will be described. Operations of the electronic device, which will be described below, may be performed by the processor (e.g., the processor 420 of FIG. 4) of the electronic device.

According to an embodiment of the disclosure, the content may be a status bar icon.

Figure 6:
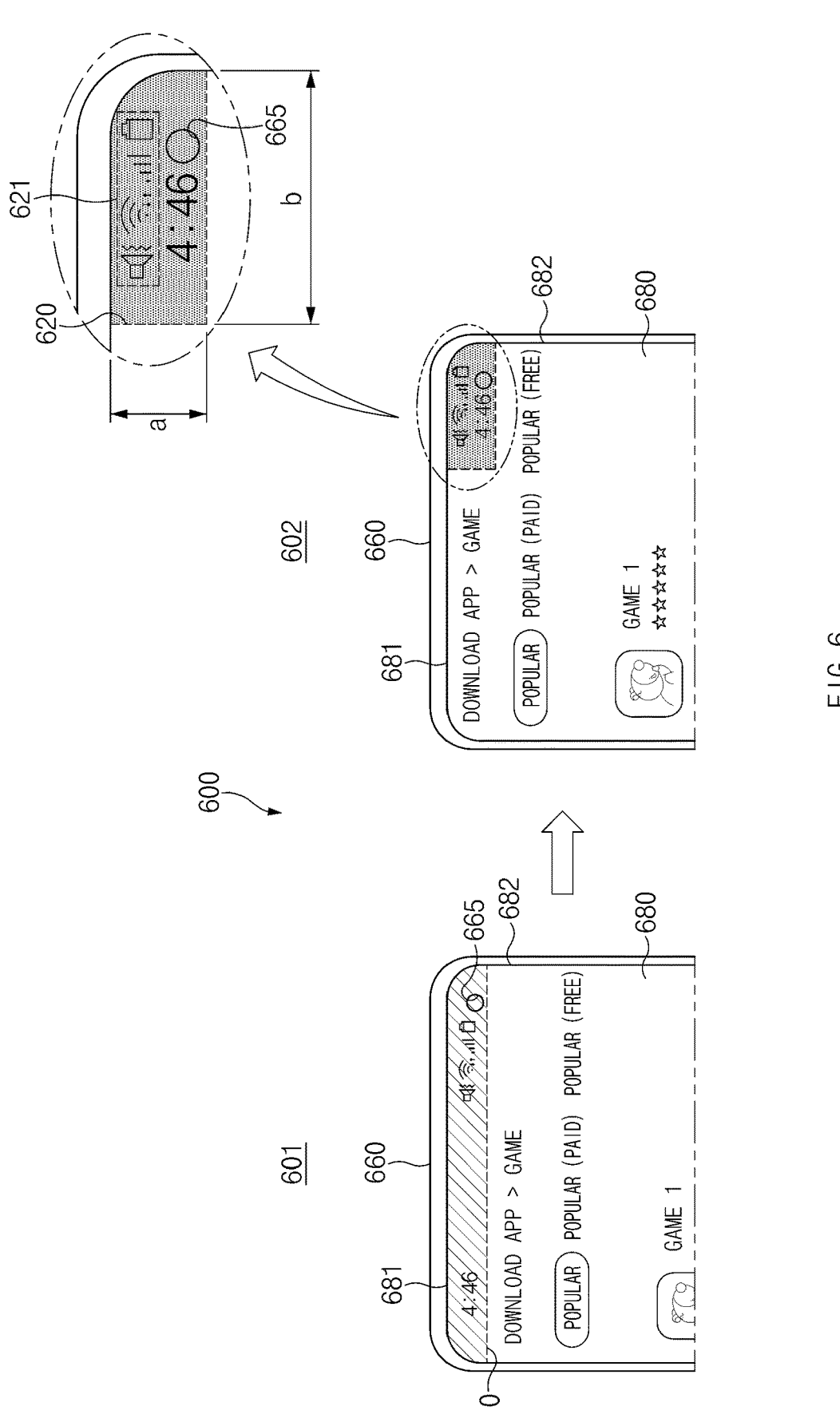
FIG. 6 is a view illustrating a method for displaying a content in an area including a first area, by an electronic device according to an embodiment of the disclosure.

FIG. 6 is a view 600 illustrating a method for displaying a content in an area including a first area 621 by an electronic device according to an embodiment of the disclosure. A first status 601 is a status, in which the electronic device does not display a content in the first area 621, and a second status 602 is a status, in which the electronic device displays a content in the first area 621. The first area 621 of FIG. 6 may correspond to the first status bar display area 311 of FIG. 3.

Referring to FIG. 6, a camera hole 665 of the electronic device may be disposed on a right upper end of a display 660.

In the first status 601, the electronic device may display a content in a first status bar display area 610. According to an embodiment of the disclosure, the first status bar display area 610 may be an area between, among two sides of a display area 680 that are substantially parallel to each other, a first side 681 that is close to the camera hole 665, and, among two tangents of the camera hole 665, a tangent that is relatively distant from the first side 681 while being substantially parallel to the first side 681. According to an embodiment of the disclosure, the electronic device may display a content in a left area of the first status bar display area 610 with respect to the camera hole 665. For example, the first status bar display area 610 may be the second status bar display area 311' of FIG. 3.

In the second status 602, the electronic device may display a content in a second status bar display area 620. According to an embodiment of the disclosure, the second status bar display area 620 may be an area within a specific distance "b" from, among two sides of the display area 680, which are substantially parallel to each other, a second side 682 that is close to the camera hole 665 while being an area within a specific distance "a" from, among the two sides of the display area 680, which are substantially parallel to each other, the first side 681 that is close to the camera hole 665. The second side 682 may be substantially perpendicular to the first side 681.

According to an embodiment of the disclosure, the second status bar display area 620 may at least partially include a first area 621 that is an area between, among two sides of the display area 680 that are substantially parallel to each other, the first side 681 that is close to the camera hole 665, and, among two tangents of the camera hole 665, a tangent that is relatively close from the first side 681 while being substantially parallel to the first side 681. According to an embodiment of the disclosure, the first area 621 may be an upper area of the camera hole 665. In the second status 602, the electronic device may display a content in the first area 621. According to an embodiment of the disclosure, the electronic device may display the contents while the contents are disposed in two rows in the second status bar display area 620. According to an embodiment of the disclosure, among the contents that are to be displayed on the display 660, at least one content may be disposed in one row in the first area 621, and the remaining content may be disposed in one row in a left area (e.g., at least a portion of the second status bar display area 620) of the camera hole 665.

According to an embodiment of the disclosure, when the content is of the first size, the electronic device may display the content in the first area 621. Then, the first size may be smaller than the size of the first area 621. According to an embodiment of the disclosure, the first size may be a value that is set to a default in the electronic device or a value that is set based on a setting input by the user.

According to various embodiments of the disclosure, the electronic device may display the content in the first area 621 when the content is of the first size or less, and may not display the content in the first area 621 when the content is of more than the first size. For example, the electronic device may display the content as in the second status 602 when the content is of the first size or less, and may display the content as in the first status 601 when the content is of more than the first size.

According to various embodiments of the disclosure, the electronic device may display a corresponding content in the first area 621 based on determining that the size of a content that is to be displayed on the display 660 is smaller than the first area 621.

According to various embodiments of the disclosure, the electronic device may display contents in the first status bar display area 610 and the second status bar display area 620. For example, the electronic device may at least partially display a content of, among a plurality of content groups (e.g., the first to n-th content groups 430-1 to 430-n of FIG. 4), the first content group 430-1 on the second status bar display area 620 when the content of the first content group 430-1 is of the first size or less, and may at least partially display a content of the second content group 430-2 in the first status bar display area 610 when the content of the second content group 430-2 is of more than the first size. According to an embodiment of the disclosure, the electronic device may display at least a portion of the content of the first content group 430-1 in the first area 621.

Hereinafter, referring to FIG. 7, a method for displaying contents in three rows in an area including the first area (e.g., the first status bar display area 311 of FIG. 3) by an electronic device (e.g., the electronic device 401 of FIG. 4) according to an embodiment will be described. Operations of the electronic device, which will be described below, may be performed by the processor (e.g., the processor 420 of FIG. 4) of the electronic device.

According to an embodiment of the disclosure, the content may be a status bar icon.

Figure 7:
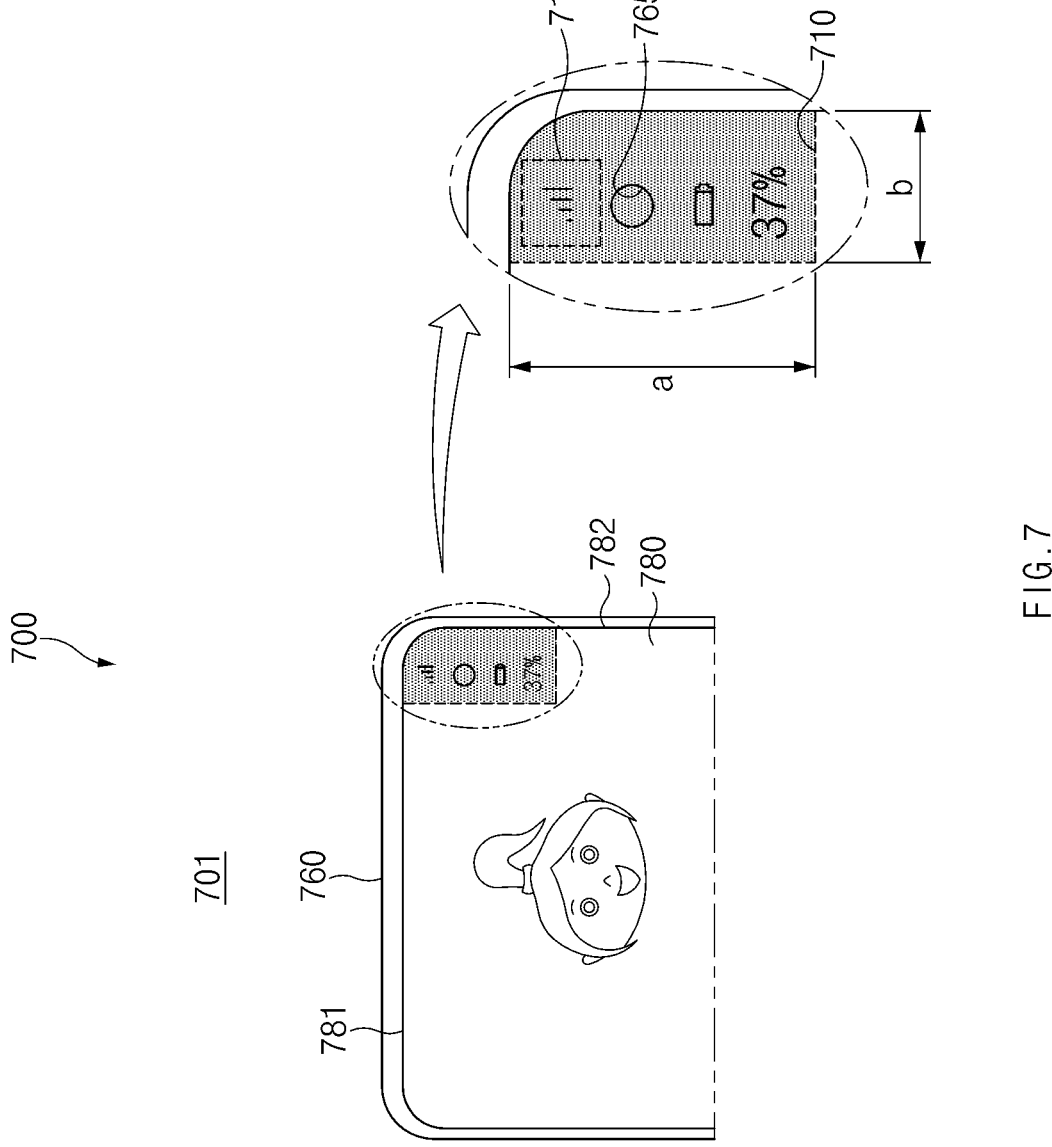
FIG. 7 is a view illustrating a method for displaying a content in an area including a first area, by an electronic device according to an embodiment of the disclosure.

FIG. 7 is a view 700 illustrating a method for displaying a content in an area including a first area 711 by an electronic device according to an embodiment of the disclosure. A first status 701 is a status, in which the electronic device displays a content in the first area. The first status 701 may correspond to the second status 602 of FIG. 6. The first area 711 of FIG. 7 may correspond to the first status bar display area 311 of FIG. 3.

Referring to FIG. 7, a camera hole 765 of the electronic device may be disposed on a right upper end of a display 760.

In the first status 701, the electronic device may display a content in a first status bar display area 710. According to an embodiment of the disclosure, the first status bar display area 710 may be an area within a specific distance "b" from a second side 782 that is close to the camera hole 765 while being an area within a specific distance "a" from, among the two sides of a display area 780, which are substantially parallel to each other, a first side 781 that is close to the camera hole 765. The first side 781 and the second side 782 may be substantially perpendicular to each other.

According to an embodiment of the disclosure, an area within a specific distance "a" from the first side 781 may partially include a lower area of the camera hole 765. Then, the lower area of the camera hole 765 may mean a lower area of, among the tangents of the camera hole 765, a tangent that is relatively distant from the first side 781 while being substantially parallel to the first side 781. Accordingly, the electronic device may display at least one content in the lower area of the camera hole 765.

According to an embodiment of the disclosure, the area within the specific distance "b" from the second side 782 may be an area between the second side 782, and, among the two tangents of the camera hole 765, a tangent that is relatively distant from the second side 782 while being substantially parallel to the second side 782. Accordingly, the electronic device may display no content in the left area of the camera hole 765.

According to an embodiment of the disclosure, the first status bar display area 710 may include the first area 711 that is an area between the first side 781, and, among the two tangents of the camera hole 765, a tangent that is relatively close to the first side 781 while being substantially parallel to the first side 781. In the first status 701, the electronic device may display a content in the first area 711.

According to an embodiment of the disclosure, the electronic device may display the contents while the contents are disposed in three rows in the first status bar display area 710. According to an embodiment of the disclosure, among the contents that are to be displayed on the display 760, at least one content may be disposed in one row in the first area 711, and the remaining contents may be disposed in two rows in the lower area of the camera hole 765.

According to an embodiment of the disclosure, when the content is of the first size, the electronic device may display the content in the first area 711. Then, the first size may be smaller than the size of the first area 711. According to an embodiment of the disclosure, the first size may be a value that is set to a default in the electronic device or a value that is set based on a setting input by the user.

According to various embodiments of the disclosure, the electronic device may display the content in the first area 711 when the content is of the first size or less, and may not display the content in the first area 711 when the content is of more than the first size. For example, the electronic device may display the content as in the first status 701 of FIG. 7 when the content is of the first size or less, and may display the content as in the first status 601 of FIG. 6 when the content is of more than the first size.

According to various embodiments of the disclosure, the electronic device may display a corresponding content in the first area 711 based on determining that the size of a content that is to be displayed on the display 760 is smaller than the first area 711.

According to an embodiment of the disclosure, the electronic device may determine whether the contents are to be disposed in two rows as in the second status 602 of FIG. 6 or are to be disposed in three rows as in the first status 701 of FIG. 7 according to the type of the contents that are to be displayed on the display and/or the status bar display setting of the electronic device.

Figure 8:
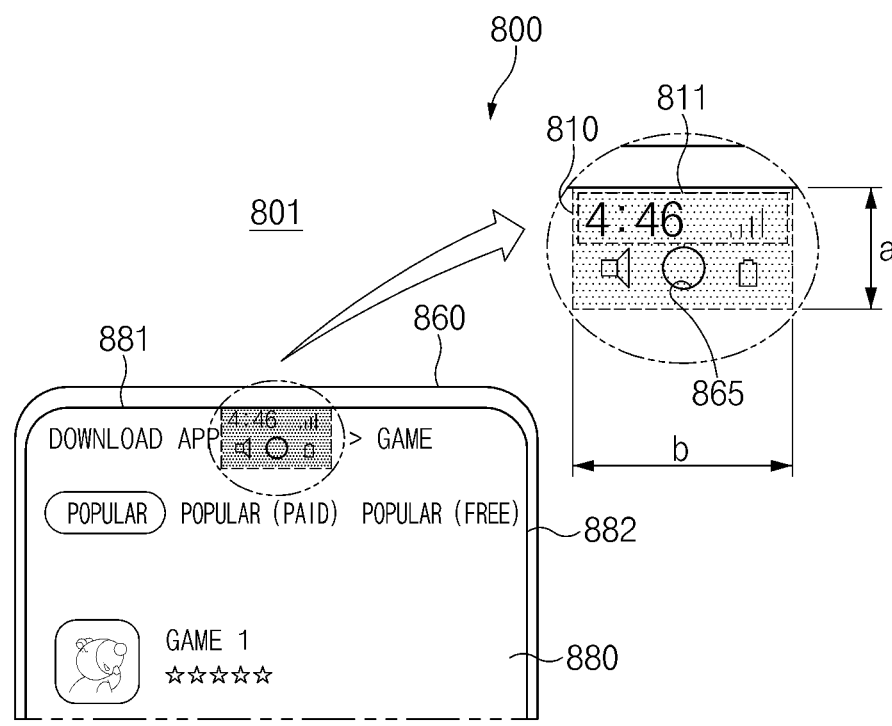
FIG. 8 is a view illustrating a method for displaying a content in an area including a first area by an electronic device according to an embodiment of the disclosure.

Hereinafter, referring to FIG. 8, a method for displaying contents in two rows in an area including the first area (e.g., the first status bar display area 311 of FIG. 3) by an electronic device (e.g., the electronic device 401 of FIG. 4) according to an embodiment will be described. Referring to FIG. 8, a camera hole 865 of the electronic device may be disposed on a central upper end of a display 860. Operations of the electronic device, which will be described below, may be performed by the processor (e.g., the processor 420 of FIG. 4) of the electronic device.

According to an embodiment of the disclosure, the content may be a status bar icon.

FIG. 8 is a view 800 illustrating a method for displaying a content in an area including a first area 811 by an electronic device according to an embodiment of the disclosure. A first status 801 is a status, in which the electronic device displays a content in the first area. The first status 801 may correspond to the second status 602 of FIG. 6 or the first status 701 of FIG. 7. The first area 811 of FIG. 8 may correspond to the first status bar display area 311 of FIG. 3.

In the first status 801, the electronic device may display a content in a first status bar display area 810. According to an embodiment of the disclosure, the first status bar display area 810 may be an area between, among two sides of a display area 880 that are substantially parallel to each other, a first side 881 that is close to the camera hole 865, and, among two tangents of the camera hole 865, a tangent that is relatively distant from the first side 881 while being substantially parallel to the first side 881.

According to an embodiment of the disclosure, the first status bar display area 810 may be an area that is within a specific distance "a" from the first side 881 and that is between two lines that are substantially perpendicular to the first side and are spaced apart from each other by a specific distance "b" while the camera hole 865 being interposed therebetween. According to an embodiment of the disclosure, the first status bar display area 810 may be a portion of a left area or a portion of a right area of the camera hole 865.

Then, the left area of the camera hole 865 may mean a left area of, among the tangents of the camera hole 865, a tangent that is relatively distant from a second side 882 while being substantially parallel to the second side 882. Then, the right area of the camera hole 865 may mean a right area of, among the tangents of the camera hole 865, a tangent that is relatively close to the second side 882 while being substantially parallel to the second side 882. The second side 882 may be substantially perpendicular to, among the sides of the display area, the first side 881.

Accordingly, the electronic device may display at least one content in a left area and/or a right area of the first status bar display area 810 with respect to the camera hole 865.

According to an embodiment of the disclosure, the first status bar display area 810 may include the first area 811 that is an area between the first side 881, and, among the two tangents of the camera hole 865, a tangent that is relatively close to the first side 881 while being substantially parallel to the first side 881. In the first status 801, the electronic device may display a content in the first area 811.

According to an embodiment of the disclosure, the electronic device may display the contents while the contents are disposed in two rows in the first status bar display area 810. According to an embodiment of the disclosure, among the contents that are to be displayed on the display 860, at least one content may be disposed in one row in the first area 811, and the remaining contents may be disposed in one row in the left area and the right area of the camera hole 865 while the camera hole 865 being interposed therebetween.

According to an embodiment of the disclosure, when the content is of the first size, the electronic device may display the content in the first area 811. Then, the first size may be smaller than the size of the first area 811. According to an embodiment of the disclosure, the first size may be a value that is set to a default in the electronic device or a value that is set based on a setting input by the user.

According to various embodiments of the disclosure, the electronic device may display the content in the first area 811 when the content is of the first size or less, and may not display the content in the first area 811 when the content is of more than the first size. For example, the electronic device may display a content as in the first status 801 of FIG. 8 when the content is of the first size or less, may display the content as in the first status 601 of FIG. 6 when the content is of more than the first size, and may display the content at least a portion of the left area and the right area with respect to the camera hole 865.

According to various embodiments of the disclosure, the electronic device may display a corresponding content in the first area 811 based on determining that the size of a content that is to be displayed on the display 860 is smaller than the first area 811.

According to an embodiment of the disclosure, the electronic device may determine a method for displaying a content in a peripheral area of the camera hole according to a location of the camera hole. For example, in the electronic device, the contents may be disposed in the upper area and the left area of the camera hole as in the second status 602 of FIG. 6, the contents may be disposed in the upper area and the lower area of the camera hole as in the first status 701 of FIG. 7, and the contents may be disposed in the upper area, the left area and the right area as in the first status 801 of FIG. 8.

Hereinafter, referring to FIG. 9A, a method for determining a location, at which a content is to be displayed, based on setting of a size of a letter of an electronic device, by the electronic device (e.g., the electronic device 401 of FIG. 4) according to an embodiment will be described. Operations of the electronic device, which will be described below, may be performed by the processor (e.g., the processor 420 of FIG. 4) of the electronic device.

Figure 9A:
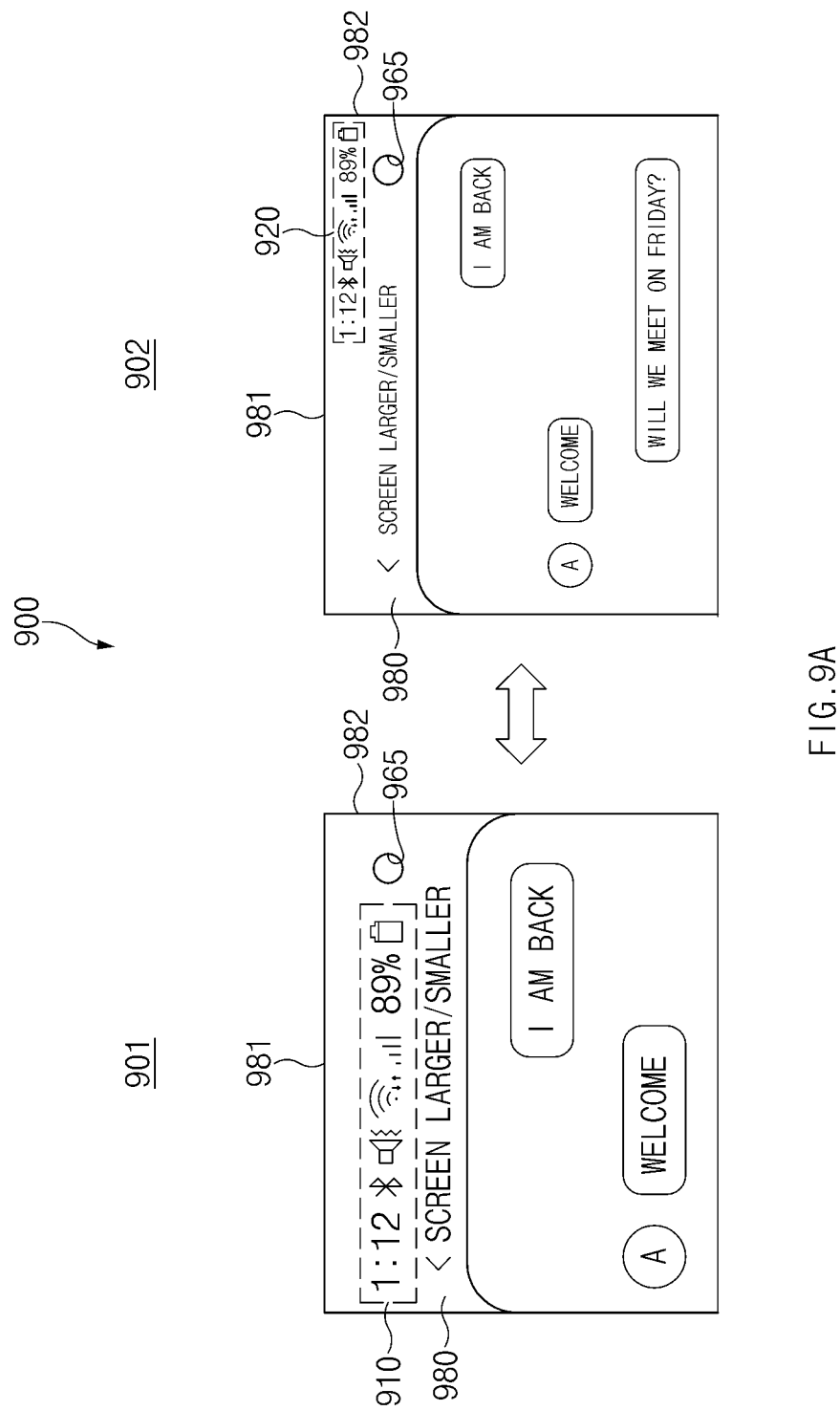
FIG. 9A is a view illustrating a method for displaying a content based on setting of a size of a letter, by an electronic device according to an embodiment of the disclosure.

FIG. 9A is a view 900 illustrating a method for displaying a content based on setting of a size of a letter, by an electronic device according to an embodiment of the disclosure. FIG. 9A is a view illustrating a display area 980 of a display (e.g., the display 460 of FIG. 4) of an electronic device in a first status 901 and a second status 902.

The first status 901 is a status, in which setting of a size of a letter of the electronic device is set to "large", and the second status 902 is a status, in which the setting of the size of the letter of the electronic device is set to "small". According to an embodiment of the disclosure, "small" may mean the first size and "large" may mean the second size. Then, the first size may be smaller than the second size.

Referring to FIG. 9A, a camera hole 965 of the electronic device may be disposed on a right upper end of the display.

In the first status 901, the electronic device may set the size of the letter to "large" based on a setting input by the user. According to an embodiment of the disclosure, the electronic device may select a content of the second size from a content group stored in the memory (e.g., the memory 430) to display the content on the display as the size of the letter is set to "large". According to an embodiment of the disclosure, the content may include a status bar icon.

According to an embodiment of the disclosure, the first status 901 may correspond to the first status 601 of FIG. 6. In the first status 901, the electronic device according to an embodiment may display at least one status bar icon in a first status bar display area 910. According to an embodiment of the disclosure, the first status bar display area 910 may be an area between, among two sides of the display area 980 that are substantially parallel to each other, a first side 981 that is close to the camera hole 965, and, among two tangents of the camera hole 965, a tangent that is relatively distant from the first side 981 while being substantially parallel to the first side 981. According to an embodiment of the disclosure, the first status bar display area 910 may be a left area of the camera hole 965.

In the second status 902, the electronic device may set the size of the letter to "small" based on a setting input by the user. According to an embodiment of the disclosure, the electronic device may select a content of the first size from a content group stored in the memory to display the content on the display as the size of the letter is set to "small". According to an embodiment of the disclosure, the content may include a status bar icon.

In the second status 902, the electronic device may display a content in a second status bar display area 920. According to an embodiment of the disclosure, the second status bar display area 920 may be the first area (e.g., the first area 310 of FIG. 3) that is an area between, among two sides of the display area 980 that are substantially parallel to each other, the first side 981 that is close to the camera hole 965, and, among two tangents of the camera hole 965, a tangent that is relatively close from the first side 981 while being substantially parallel to the first side 981. According to an embodiment of the disclosure, the first area may be an upper area of the camera hole 965. In the second status 902, the electronic device may display the at least one status bar icon in the first area.

According to an embodiment of the disclosure, the second status bar display area 920 may be an area within a specific distance from, among the two sides of the display area 980, which are substantially parallel to each other, a second side 982 that is close to the camera hole 965. The second side 982 may be substantially perpendicular to the first side 981. According to an embodiment of the disclosure, the second status bar display area 920 may correspond to the first status bar display area 311 of FIG. 3.

According to an embodiment of the disclosure, the electronic device may determine a size of a content that is to be displayed in the status bar display area based on setting of a size of a letter of the electronic device. For example, as the size of the letter of the electronic device is set to "small", the electronic device may determine a size of a status bar icon that is to be displayed as the first size.

According to an embodiment of the disclosure, the electronic device may display a content that is to be displayed in the status bar display area in the first area (e.g., the second status bar display area 920) when the content is of the first size. Then, the first size may be smaller than a size of the first area (e.g., the second status bar display area 920 of FIG. 9A). According to an embodiment of the disclosure, the first size may mean a height of the content, and a size of the first area (e.g., the second status bar display area 920 of FIG. 9A) may mean a height of the area. Because setting of the size of the letter of the electronic device is based on a setting input by the user, a size of a content and/or a location of the content may be set based on the setting input by the user.

According to an embodiment of the disclosure, the electronic device may display the status bar icon as in the first status 901 or the second status 902 based on the setting input by the user. When the electronic device according to an embodiment of the disclosure is in the first status 901, the size of the status bar icon is larger than in the second status 902, and thus the user may easily visually identify the status bar icon. When the electronic device according to an embodiment is in the second status 902, the status bar display area becomes smaller and the main display area becomes larger, and thus the user may receive the content displayed in the main display area on a wider screen.

Hereinafter, referring to FIGS. 9B to 9D, a method for determining a location, at which a content is to be displayed, based on a size and an aspect ratio of a display 960 (e.g., the display 460 of FIG. 4) of the electronic device, by the electronic device (e.g., the electronic device 401 of FIG. 4) according to an embodiment will be described. Operations of the electronic device, which will be described below, may be performed by the processor (e.g., the processor 420 of FIG. 4) of the electronic device.

According to an embodiment of the disclosure, the electronic device may identify the size and the aspect ratio of the display 960. For example, when the display 960 of the electronic device is formed in a rollable scheme or a foldable scheme, the size and the aspect ratio of the display 960 may be changed according to movement of the display 960 or a portion of the housing connected to the display 960. The electronic device, for example, may detect movement of the display 960 or a portion of the housing connected to the display 960 through a sensor (e.g., the sensor module 176 of FIG. 1), and may identify the size and the aspect ratio of the display 960 based on the detected result.

Figure 9B:
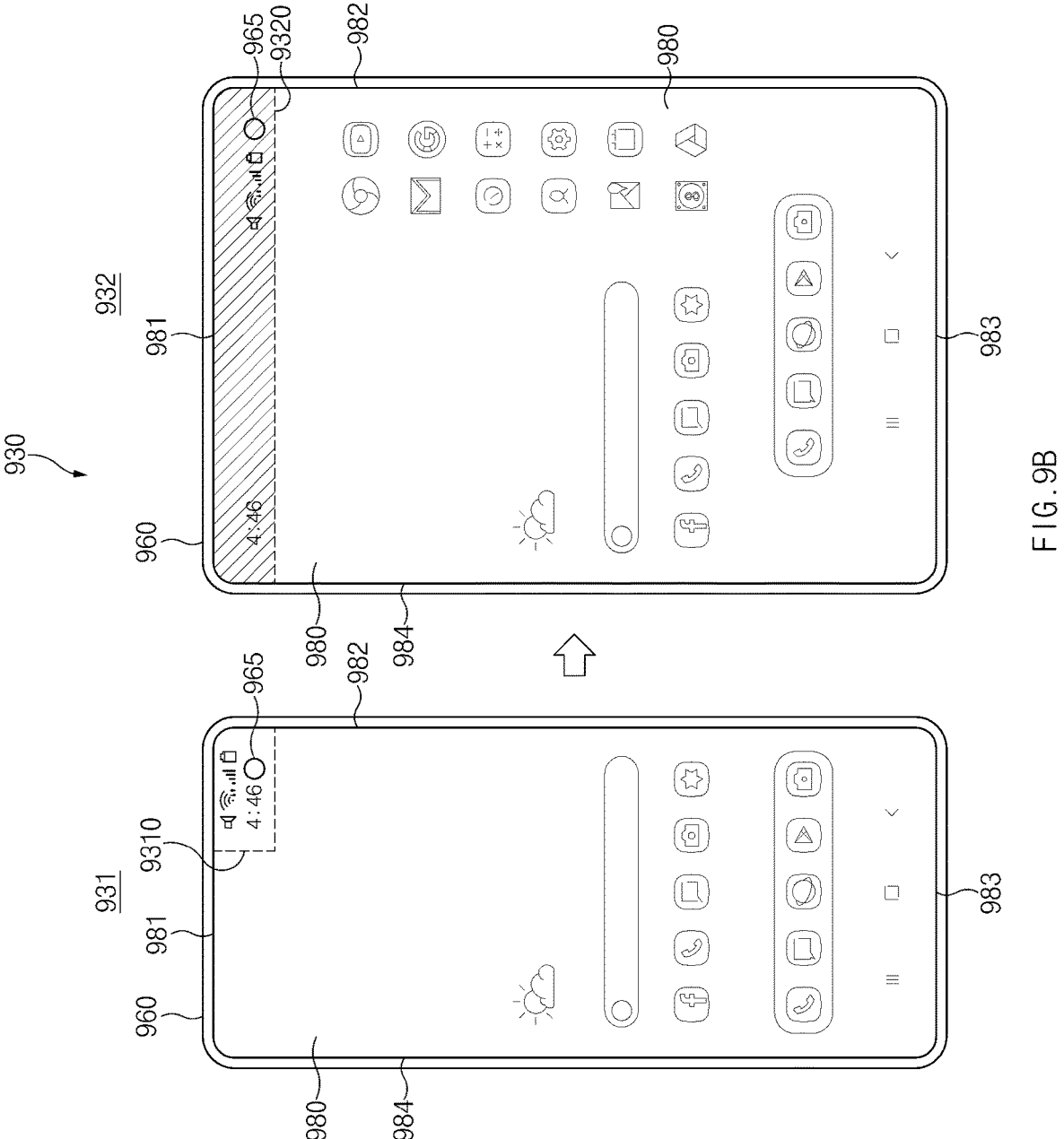
FIGS. 9B, 9C, and 9D are views illustrating a method for determining a location, at which a content is to be displayed, based on a size and an aspect ratio of a display, by an electronic device according to various embodiments of the disclosure.
Figure 9C:
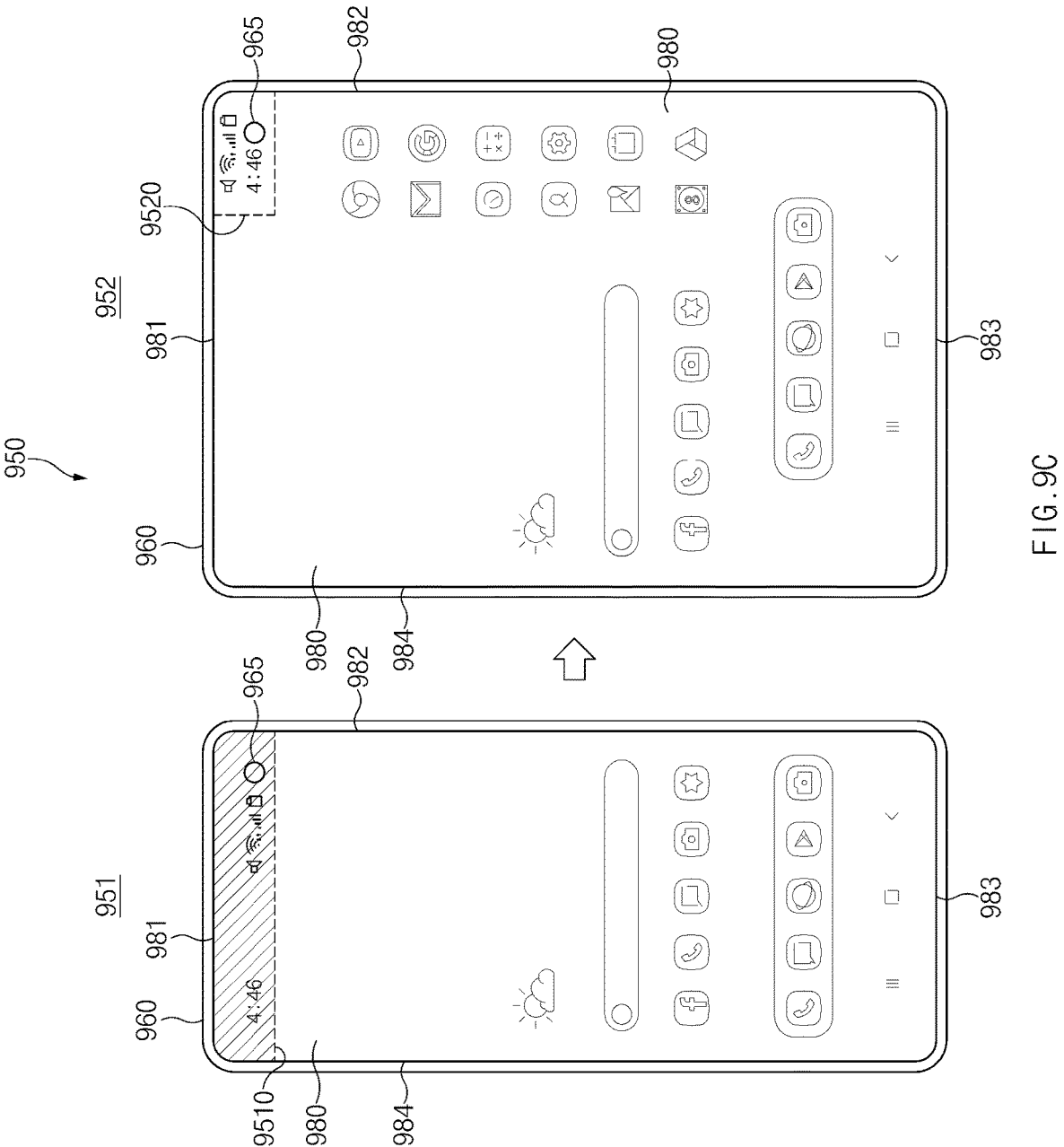
Figure 9D:
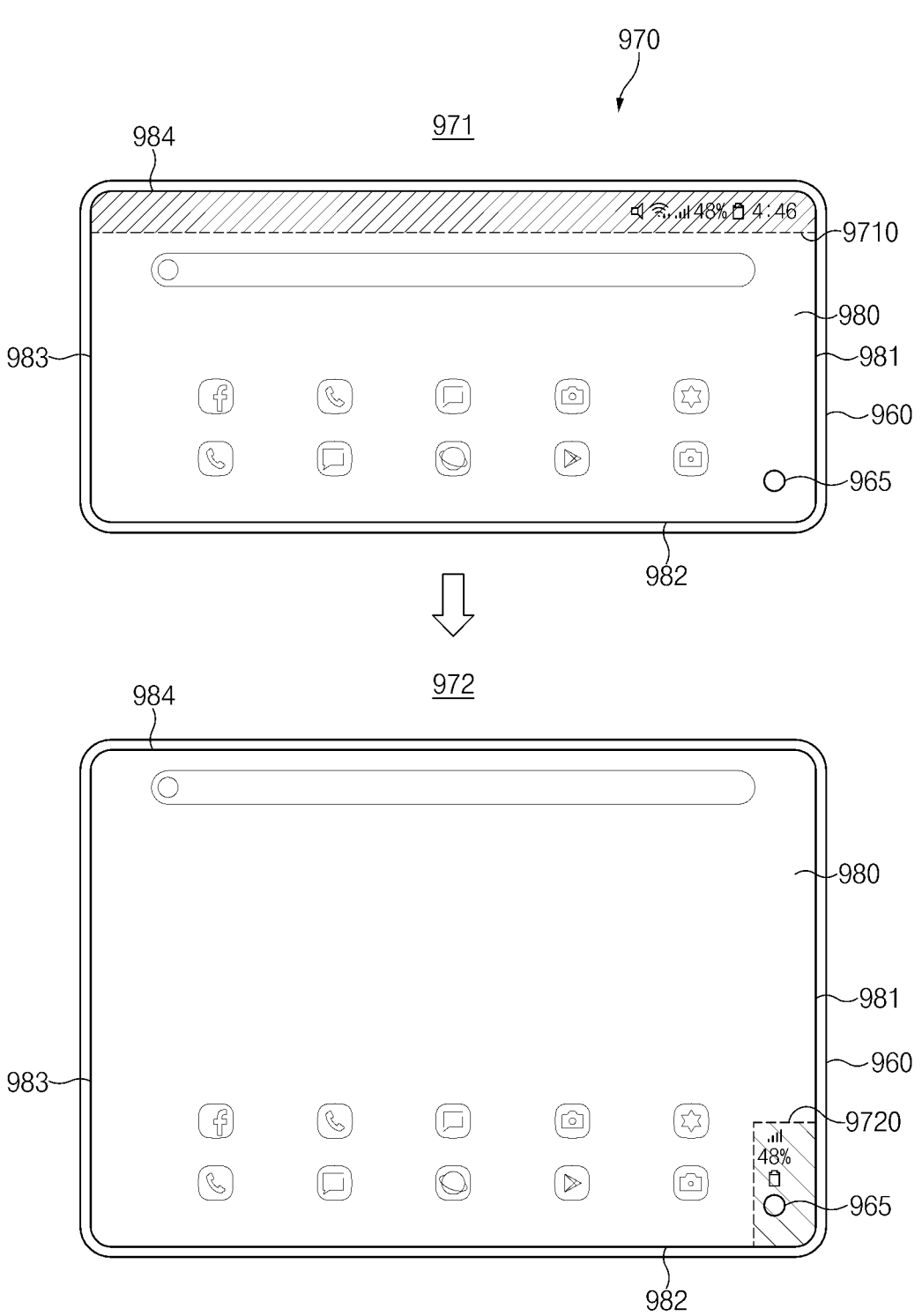

FIGS. 9B to 9D are views illustrating a method for determining a location, at which a content is to be displayed, based on a size and an aspect ratio of a display, by an electronic device according to various embodiments of the disclosure.

Referring to FIG. 9B, for example, when the display 960 of an electronic device 930 is a rollable (or slidable) display, the size of the display 960 may become larger and the display 960 may be in a second status 932, in which a transverse length thereof is increased, as the display 960 of the electronic device is moved from a first status 931 in a positive (+) direction of the X axis of FIG. 3. According to an embodiment of the disclosure, the first status 931 may be referred to as a non-expansion mode of the electronic device, and the second status 932 may be referred to as an expansion mode of the electronic device.

According to an embodiment of the disclosure, the electronic device may be configured to display at least one status bar icon in a first status bar display area 9310 in the non-expansion mode 931, and may be configured to display at least one status bar icon in a second status bar display area 9320 in the expansion mode 932. The at least one status bar icon may be a content that is stored in at least one content group of a memory (e.g., the memory 430 of FIG. 4) of the electronic device.

According to an embodiment of the disclosure, the first status bar display area 9310 may correspond to the second status bar display area 620 of FIG. 6. The first status bar display area 9310 may be an area within a specific distance from, among two sides (the first side 981 and a third side 983) of the display area 980, which are substantially parallel to each other, the first side 981 that is close to the camera hole 965, and may be an area within a specific distance from, among two sides (the second side 982 and a fourth side 984) of the display area 980, which are substantially parallel to each other, the second side 982 that is close to the camera hole 965. The second side 982 may be substantially perpendicular to the first side 981.

According to an embodiment of the disclosure, the first status bar display area 9310 may include at least a portion of a first area (e.g., the first area 310 of FIG. 3, the first area 621 of FIG. 6, or the second status bar display area 920 of FIG. 9A) that is an area between, among two sides (the first side 981 and the third side 983) of the display area 980, which are parallel to each other, the first side 981 that is close to a camera hole 985, and, among two tangents of the camera hole 965, a tangent that is relatively close to the first side 981 while being substantially parallel to the first side 981. According to an embodiment of the disclosure, the electronic device may display at least one content in the first area of the first status bar display area 9310 in the non-expansion mode 931.

According to an embodiment of the disclosure, the second status bar display area 9320 may correspond to the first status bar display area 610 of FIG. 6. The second status bar display area 9320 may be an area between, among two sides (the first side 981 and the third side 983) of the display area 980, which are substantially parallel to each other, the first side 981 that is close to the camera hole 965, and, among two tangents of the camera hole 965, a tangent that is relatively distant from the first side 981 while being substantially parallel to the first side 981. According to an embodiment of the disclosure, the electronic device may display at least one content not in the first area of the second status bar display area 9320 but in the left area of the camera hole 965 in the expansion mode 932.

According to an embodiment of the disclosure, the electronic device may be configured to display at least one content in the first area in the non-expansion mode 931, and not to display at least one content in the first area in the expansion mode 932.

According to an embodiment of the disclosure, the electronic device may determine whether the display 960 is in the non-expansion mode 931 or in the expansion mode 932 based on the size and the aspect ratio of the display 960. The electronic device may determine that the electronic device is in the non-expansion mode 931 when the size of the display 960 is less than a specific size or the aspect ratio is a specific first ratio (e.g., a ratio of a transverse length to a longitudinal length is 3:4), and may display at least one content in the first status bar display area 9310 as it is determined that the electronic device is in the non-expansion mode 931. According to an embodiment of the disclosure, the electronic device may display at least one content in at least a portion of the first area of the first status bar display area 9310. The electronic device may determine that the electronic device is in the expansion mode 932 when the size of the display 960 is less than a specific size or the aspect ratio is a specific second ratio (e.g., a ratio of a transverse length to a longitudinal length is 4:3), and may display at least one content in the second status bar display area 9320 as it is determined that the electronic device is in the expansion mode 932. According to an embodiment of the disclosure, the electronic device may display a content not in the first area of the second status bar display area 9320 but in the left area of the camera hole 965.

According to an embodiment of the disclosure, the electronic device may display at least one status bar icon in the first status bar display area 9310 in the non-expansion mode 931 such that a smaller screen may be efficiently used than in the expansion mode 932.

Referring to FIG. 9C, for example, when the display 960 of the electronic device 950 is a rollable (or slidable) display, the size of the display 960 may become larger and the display 960 may be in a second status 952, in which a transverse length thereof is increased, as the display 960 of the electronic device is moved from a first status 951 in a positive (+) direction of the X axis of FIG. 3. According to an embodiment of the disclosure, the first status 951 may be referred to as a non-expansion mode of the electronic device, and the second status 952 may be referred to as an expansion mode of the electronic device.

According to an embodiment of the disclosure, the electronic device may be configured to display at least one status bar icon in a first status bar display area 9510 in the non-expansion mode 951, and may be configured to display at least one status bar icon in a second status bar display area 9520 in the expansion mode 952. The at least one status bar icon may be a content that is stored in at least one content group of a memory (e.g., the memory 430 of FIG. 4) of the electronic device.

According to an embodiment of the disclosure, the first status bar display area 9510 may correspond to the second status bar display area 9320 of FIG. 9B, and the second status bar display area 9520 may correspond to the first status bar display area 9310 of FIG. 9B. Accordingly, because the above description of the second status bar display area 9320 of FIG. 9B may be applied to the first status bar display area 9510 in the same way and the above description of the first status bar display area 9310 of FIG. 9B may be applied to the second status bar display area 9520 in the same way, a repeated description thereof will be simply made or omitted.

According to an embodiment of the disclosure, the electronic device may display at least one content not in the first area of the first status bar display area 9510 but in the left area of the camera hole 965 in the non-expansion mode 951, and may display at least one content in the first area of the second status bar display area 9520 in the expansion mode 952. The first area may be an area between, among two sides of the display area 980 that are substantially parallel to each other, the first side 981 that is close to the camera hole 965, and, among two tangents of the camera hole 965, a tangent that is relatively close to the first side 981 while being substantially parallel to the first side 681. According to an embodiment of the disclosure, the electronic device may be configured not to display at least one content in the first area in the non-expansion mode 951, and to display at least one content in the first area in the expansion mode 952.

According to an embodiment of the disclosure, the electronic device may determine whether the display 960 is in the non-expansion mode 951 or in the expansion mode 952 based on the size and the aspect ratio of the display 960. The electronic device may determine that the electronic device is in the non-expansion mode 951 when the size of the display 960 is less than a specific size or the aspect ratio is a specific first ratio (e.g., a ratio of a transverse length to a longitudinal length is 3:4), and may display at least one content in the first status bar display area 9510 as it is determined that the electronic device is in the non-expansion mode 951. According to an embodiment of the disclosure, the electronic device may display a content not in the first area of the first status bar display area 9510 but in the left area of the camera hole 965. The electronic device may determine that the electronic device is in the expansion mode 952 when the size of the display 960 is less than a specific size or the aspect ratio is a specific second ratio (e.g., a ratio of a transverse length to a longitudinal length is 4:3), and may display at least one content in the second status bar display area 9520 as it is determined that the electronic device is in the expansion mode 952. According to an embodiment of the disclosure, the electronic device may display at least one content in at least a portion of the first area of the second status bar display area 9520.

According to an embodiment of the disclosure, the electronic device may display at least one status bar icon in the second status bar display area 9320 in the expansion mode 952 such that an area corresponding to the display area 980 in the non-expansion mode 951 may be utilized as a full screen in the expansion mode 952.

An electronic device 970 according to an embodiment illustrated in FIG. 9D may be a landscape mode, in which a transverse length of the display 960 is larger than a longitudinal length thereof Referring to FIG. 9D, for example, when the display 960 of the electronic device is a rollable (or slidable) display, the size of the display 960 may become larger and the display 960 may be in a second status 972, in which a longitudinal length thereof is increased in the landscape mode, as the display 960 of the electronic device is moved from a first status 971 in a positive (+) or negative (−) direction of the X axis of FIG. 3 (e.g., as the first side 981 and the third side 983 of the display area 980 become larger). According to an embodiment of the disclosure, the first status 971 may be referred to as a non-expansion mode of the electronic device, and the second status 972 may be referred to as an expansion mode of the electronic device.

According to an embodiment of the disclosure, the electronic device may be configured to display at least one status bar icon in a first status bar display area 9710 in the non-expansion mode 971, and may be configured to display at least one status bar icon in a second status bar display area 9720 in the expansion mode 972. The at least one status bar icon may be a content that is stored in at least one content group of a memory (e.g., the memory 430 of FIG. 4) of the electronic device.

According to an embodiment of the disclosure, the first status bar display area 9710 may be an area within a specific distance from, among four sides of the display area 980, the fourth side 984 that corresponds to an upper area of the display 960 in the landscape mode.

According to an embodiment of the disclosure, the second status bar display area 9720 may be an area within a specific distance from, among the four sides of the display area 980, two sides (the first side 981 and the second side 982) that are adjacent to the camera hole 965. According to an embodiment of the disclosure, the second status bar display area 9720 may be an area within a specific distance from, among two sides (the first side 981 and the third side 983) of the display area 980, which are substantially parallel to each other, the first side 981 that is close to the camera hole 965, and may be an area within a specific distance from, among two sides (the second side 982 and the fourth side 984) of the display area 980, which are substantially parallel to each other, the second side 982 that is close to the camera hole 965. The second side 982 may be substantially perpendicular to the first side 981.

According to an embodiment of the disclosure, the electronic device may determine whether the display 960 is in the non-expansion mode 971 or in the expansion mode 972 based on the size and the aspect ratio of the display 960. The electronic device may determine that the electronic device is in the non-expansion mode 971 when the size of the display 960 is less than a specific size or the aspect ratio is a specific first ratio (e.g., a ratio of a transverse length to a longitudinal length is 4:3), and may display at least one content in the first status bar display area 9710 as it is determined that the electronic device is in the non-expansion mode 971. The electronic device may determine that the electronic device is in the expansion mode 972 when the size of the display 960 is less than a specific size or the aspect ratio is a specific second ratio (e.g., a ratio of a transverse length to a longitudinal length is 3:4), and may display at least one content in the second status bar display area 9720 as it is determined that the electronic device is in the expansion mode 972.

According to an embodiment of the disclosure, when a longitudinal length of the display 960 of the electronic device becomes larger as illustrated in FIG. 9D, the specific second ratio may be a ratio, in which the ratio of the longitudinal length is increased as compared with the first ratio, and when a transverse length of the display 960 of the electronic device becomes larger as illustrated in FIGS. 9B and 9C, the specific second ratio may be a ratio, in which the ratio of the transverse length is increased as compared with the first ratio.

According to various embodiments described above with reference to FIGS. 9B to 9D, the electronic device may determine an area, in which a content (e.g., a status bar icon) is to be displayed, based on a change in the size and the aspect ratio of the display 960. For example, when the display 960 of the electronic device is formed in a foldable scheme, the change in the size and the aspect ratio of the display 960 may be identified based on whether the display 960 is unfolded, and as another example, when the display 960 of the electronic device is formed in a slidable scheme, the change in the size and the aspect ratio of the display 960 may be identified based on whether the display 960 of the electronic device is expanded.

Hereinafter, referring to FIG. 10, a method for displaying a content displayed in a first area 1010 (e.g., the first area 310 of FIG. 3) in a second area 1020 (e.g., the second area 320 of FIG. 3) as a direction of the electronic device (e.g., the electronic device 401 of FIG. 4) according to an embodiment is changed will be described. Operations of the electronic device, which will be described below, may be performed by the processor (e.g., the processor 420 of FIG. 4) of the electronic device.

Figure 10:
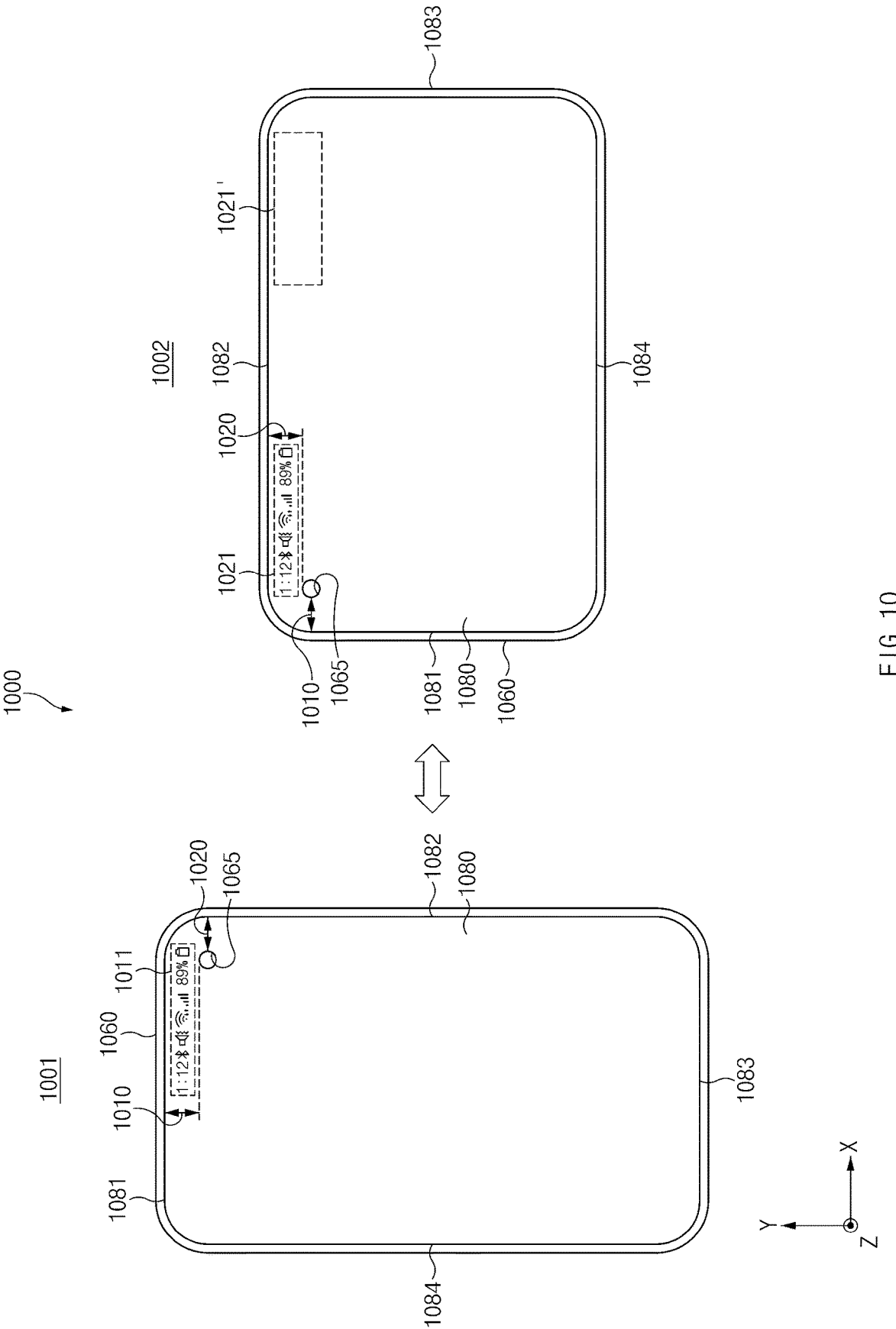
FIG. 10 is a view illustrating a method for displaying a content in a second area by an electronic device according to an embodiment of the disclosure.

FIG. 10 is a view 1000 illustrating a method for displaying a content in the second area 1020 by an electronic device according to an embodiment of the disclosure.

In a first status 1001, the electronic device is in a portrait mode, and in a second status 1002, the electronic device is in a landscape mode. The second status 1002 may be a status, in which the electronic device is rotated by about 90 degrees in a counterclockwise direction while the Z axis being taken as a rotational axis thereof in the first status 1001. According to an embodiment of the disclosure, the portrait mode of the electronic device may mean that a longitudinal length (the Y axis direction) of a display 1060 is larger than a transverse direction (the X axis direction) thereof, and the landscape mode of the electronic device may mean that the transverse length (the X axis direction) of the display 1060 is larger than the longitudinal length (the Y axis direction) thereof The landscape/portrait mode of the electronic device, as described above, may be identified based on a result detected by a sensor (e.g., the sensor module 176 of FIG. 1) included in the electronic device. According to an embodiment of the disclosure, the sensor may identify a change in the direction of the electronic device from the landscape mode to the portrait mode or from the portrait mode to the landscape mode.

Referring to FIG. 10, a camera hole 1065 may be located on a right upper end of the display 1060 with reference to a case, in which the electronic device is in the portrait mode, and may be located at a left upper end of the display 1060 with reference to a case, in which the electronic device is in the landscape mode.

According to an embodiment of the disclosure, a display area 1080 of the display 1060 may be exposed through a first surface (e.g., the first surface 211 of FIG. 2) of the electronic device, and the display area 1080 may include four sides (a first side 1081, a second side 1082, a third side 1083, and a fourth side 1084). According to an embodiment of the disclosure, the first side 1081 and the third side 1083 may be substantially parallel to each other, and the second side 1082 and the fourth side 1084 may be substantially parallel to each other.

According to an embodiment of the disclosure, the camera hole 1065 may be disposed in the display 1060 to be relatively close to, among the first side 1081 and the third side 1083, the first side 1081, and to be relatively close to, among the second side 1082 and the fourth side 1084, the second side 1082.

According to an embodiment of the disclosure, the electronic device in the portrait mode may display a content in the first area 1010. According to an embodiment of the disclosure, the content displayed in the first area 1010 may be a status bar icon.

According to an embodiment of the disclosure, the first area 1010 may be an area between, among two sides of the first side 1081 and the third side 1083 of the display area 1080 of the display 1060, which are substantially parallel to each other, the first side 1081 that is close to the camera hole 1065, and, among two tangents of the camera hole 1065, which are substantially parallel to the first side 1081, the first tangent that is close to the first side 1081. The first area 1010 may correspond to the first area 310 of FIG. 3.

According to an embodiment of the disclosure, the electronic device may display a content in a first status bar display area 1011 that is an area within a specific distance from, among the second side 1082 and the fourth side 1084 of the display area 1080 of the display 1060 of the first area 1010, the second side 1082 that is close to the camera hole 1065. Then, the second side 1082 may be different from the first side 1081 and may be substantially perpendicular to the first side 1081. The first status bar display area 1011 may correspond to the first status bar display area 311 of FIG. 3. For example, the first status bar display area 1011 may mean an area of the first area 1010, which is adjacent to the camera hole 1065.

According to an embodiment of the disclosure, the electronic device in the landscape mode may display a content in the second area 1020. According to an embodiment of the disclosure, the electronic device may change a location of the content such that the content displayed in the first area 1010 is displayed in the second area 1020 as a direction of the electronic device is changed from the portrait mode to the landscape mode.

According to an embodiment of the disclosure, the electronic device in the landscape mode may display a content in the second area 1020. According to an embodiment of the disclosure, the second area may be an area between the second tangent of the camera hole 1065 and the second side 1082 of the display area 1080. The second side 1082 may be one of four sides of the display area 1080, which is closest to the second tangent while being parallel to the second tangent. The second tangent may be different from the first tangent. According to an embodiment of the disclosure, the second tangent may be substantially perpendicular to the first tangent.

According to an embodiment of the disclosure, the second area 1020 may be an area between, among two sides of the second side 1082 and the fourth side 1084 of the display area 1080 of the display 1060, which are substantially parallel to each other, the second side 1082 that is close to the camera hole 1065, and, among two tangents of the camera hole 1065, which are substantially parallel to the second side 1082, the second tangent that is close to the second side 1082. The second area 1020 may correspond to the second area 320 of FIG. 3.

According to an embodiment of the disclosure, the electronic device may display a content in a second status bar display area 1021 that is an area within a specific distance from, among the first side 1081 and the third side 1083 of the display area 1080 of the display 1060 of the second area 1020, which are substantially parallel to each other, the first side 1081 that is close to the camera hole 1065. According to the above description, the first side 1081 may be different from the second side 1082 and may be substantially perpendicular to the second side 1082. The second status bar display area 1021 may mean an area of the second area 1020, which is adjacent to the camera hole 1065.

According to an embodiment of the disclosure, when the content is of the second size, the processor of the electronic device may display the content in the second area 1020. According to an embodiment of the disclosure, the second size may be smaller than the size of the second area 1020. Then, the second size may mean a height of the content, and the size of the second area 1020 may mean a distance between the second tangent and the second side 1082.

According to an embodiment of the disclosure, the processor 420 may display a content in the second area 1020 when the content is of the second size or less, and may display the content in the left area or the right area of the camera hole 1065 when the content is of more than the second size. Then, the left area or the right area of the camera hole 1065 may be the left area or the right area of the camera hole 1065, among areas between, among two sides of the display area, which are substantially parallel to each other, the second side 1082 that is close to the camera hole 1065, and, among two tangents that are substantially parallel to the second side 1082, the tangent that is relatively distant from the second side 1082.

In addition, the contents described regarding the method for displaying a content in the first area 1010 may be applied to the method for displaying a content in the second area 1020 by the electronic device in the same way.

Meanwhile, it has been exemplified in the above-described embodiment that the direction of the electronic device is changed from the portrait mode to the landscape mode, but in contrast, the electronic device may change a location of the content displayed in the second area such that the content is displayed in the first area when the direction of the electronic device is changed from the landscape mode to the portrait mode.

According to an embodiment of the disclosure, the electronic device may display a content in a peripheral area of the camera hole 1065. According to an embodiment of the disclosure, the peripheral area of the camera hole 1065 may mean an area within a specific distance from, among the sides of the display area 1080, the side that is closest to the camera hole 1065. According to an embodiment of the disclosure, when the camera hole 1065 of the electronic device is inclined to the left side or the right side of the display 1060, the electronic device may display the content to be biased in the direction, in which the camera hole 1065 is inclined.

For example, the camera hole 1065 may be located at a right upper end of the display 1060 in the first status 1001, and thus, the electronic device may display a content in the first status bar display area 1011 that is a right upper end area of the display area 1080. Accordingly, the electronic device may use the left upper end area of the display area 1080 as the main display area. The camera hole 1065 may be located at a left upper end of the display 1060 in the second status 1002, and thus, the electronic device may display a content in the second status bar display area 1021 that is a left upper end area of the display area 1080. Accordingly, the electronic device may use the right upper end area of the display area 1080 as the main display area.

Conventionally, a status bar is displayed in a third status bar display area 1021' when the mode of the electronic device is changed to the landscape mode and an entire upper end area of the display area 1080 including the camera hole 1065 is a dead zone, but in the electronic device according to an embodiment of the disclosure, a status bar may be displayed in the second status bar display area 1021, whereby the third status bar display area 1021' may be further utilized as the main display area and a dead zone may be reduced to the peripheral area of the camera hole 1065.

Hereinafter, referring to FIG. 11, a method for displaying a content based on whether a camera module (e.g., the camera module 180 of FIG. 1) is active, by the electronic device, when the display (e.g., the display 460 of FIG. 4) of the electronic device (e.g., the electronic device 401 of FIG. 4) has a UDC structure will be described. Operations of the electronic device, which will be described below, may be performed by the processor (e.g., the processor 420 of FIG. 4) of the electronic device.

When the display has a UDC structure according to an embodiment of the disclosure, the electronic device may display a content in an area 1165 corresponding to the camera hole. According to an embodiment of the disclosure, the electronic device having a display of a UDC structure may determine whether a content is to be displayed in the area 1165 corresponding to the camera hole based on whether the camera module included in the electronic device is active.

Figure 11:
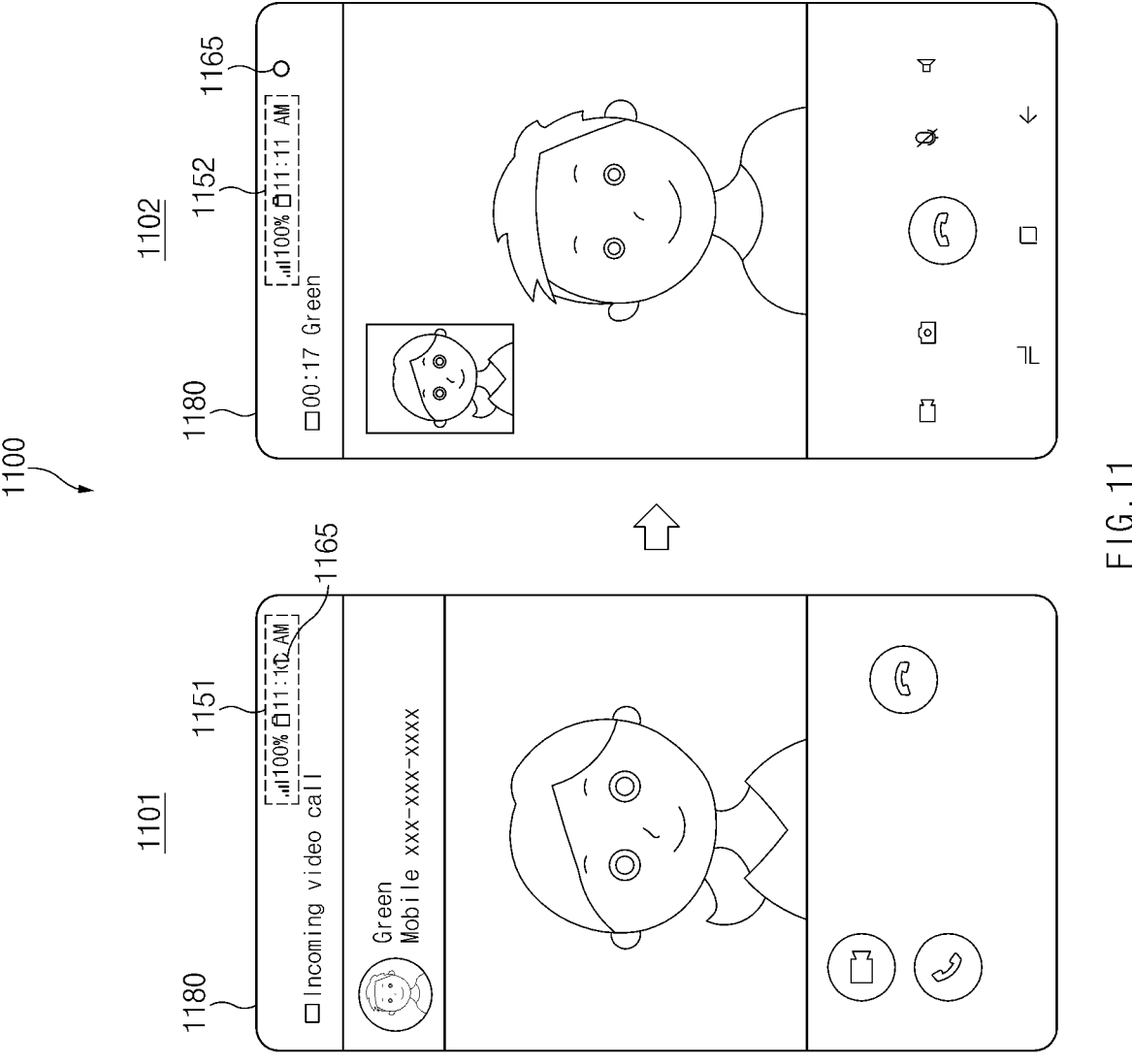
FIG. 11 is a view illustrating a method for displaying a content based on whether a camera module is active, by an electronic device according to an embodiment of the disclosure.

FIG. 11 is a view 1100 illustrating a method for displaying a content based on whether the camera module is active, by the electronic device according to an embodiment of the disclosure. Hereinafter, it is assumed that the content is a status bar icon.

The electronic device according to an embodiment of the disclosure may display a content in an area, except for the area 1165 corresponding to the camera hole as the camera module becomes active, and may display a content in an area including the area 1165 corresponding to the camera hole as the camera module becomes inactive.

A first status 1101 is a status, in which the camera module of the electronic device is inactive, and a second status 1102 is a status, in which the camera module of the electronic device is active. Referring to FIG. 11, for example, the electronic device in the first status 1101 may be a status, before the electronic device receives an input by the user of accepting a call for a video communication after receiving the call, and the electronic device in the second status 1102 may be a status after the electronic device receives the input by the user of accepting the call.

In the first status 1101, the electronic device may display a content in a first status bar display area 1151 of a display area 1180 as it identifies that the camera module is in an inactive state. According to an embodiment of the disclosure, the first status bar display area 1151 may include the area 1165 of the display area 1180, which corresponds to the camera hole.

In the second status 1102, the electronic device may display a content in a second status bar display area 1152 of the display area 1180 as it identifies that the camera module is in an active state. According to an embodiment of the disclosure, the second status bar display area 1152 may not include the area 1165 of the display area 1180, which corresponds to the camera hole. For example, in the second status 1102, the electronic device may display a content in an area, except for the area 1165 corresponding to the camera hole.

According to an embodiment of the disclosure, the second status bar display area 1152 may be a left area or a right area of the area 1165 corresponding to the camera hole. As in the embodiment illustrated in FIG. 11, when the area 1165 corresponding to the camera hole is inclined to the right side of the display area 1180, the second status bar display area 1152 may be a left area of the area 1165 corresponding to the camera hole.

Hereinafter, referring to FIG. 12, another method for displaying a content as the camera module (e.g., the camera module 180 of FIG. 1) becomes active, by the electronic device, when the display (e.g., the display 460 of FIG. 4) of the electronic device (e.g., the electronic device 401 of FIG. 4) has a UDC structure will be described. Operations of the electronic device, which will be described below, may be performed by the processor (e.g., the processor 420 of FIG. 4) of the electronic device.

Figure 12:
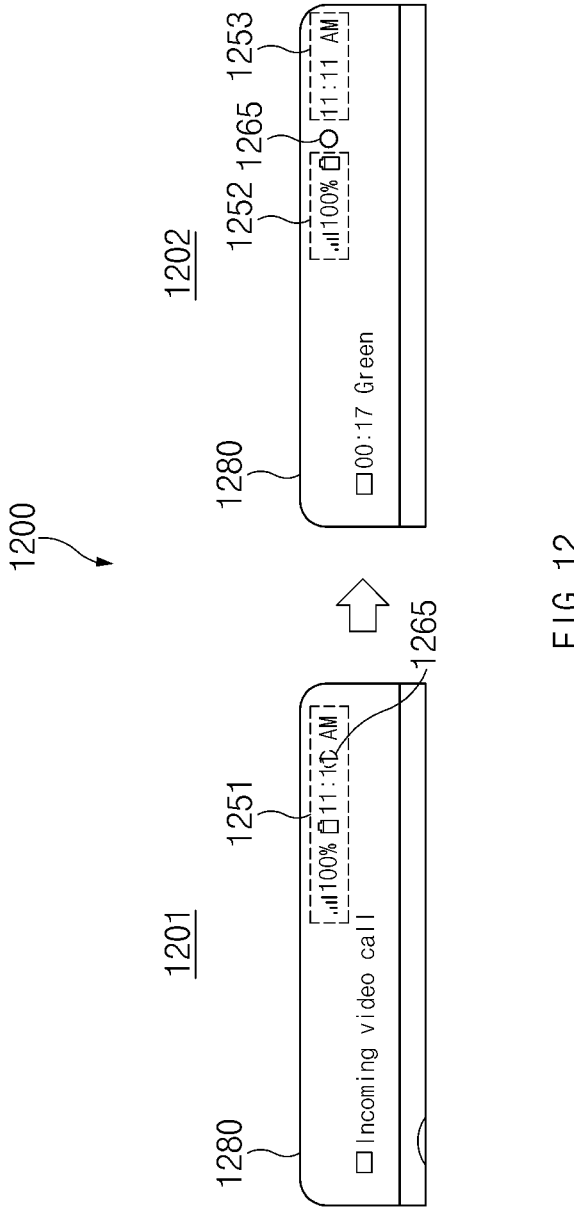
FIG. 12 is a view illustrating a method for displaying a content when a camera module becomes active, by an electronic device according to an embodiment of the disclosure.

FIG. 12 is a view 1200 illustrating a method for displaying a content when the camera module becomes active, by the electronic device according to an embodiment of the disclosure. Hereinafter, it is assumed that the content is a status bar icon.

A first status 1201 is a status, in which the camera module of the electronic device is inactive, and a second status 1202 is a status, in which the camera module of the electronic device is active. The first status 1201 of FIG. 12 may correspond to the first status 1101 of FIG. 11, and the second status 1202 of FIG. 12 may correspond to the second status 1102 of FIG. 11.

In the first status 1201, the electronic device may display a content in a first status bar display area 1251 of a display area 1280 as it identifies that the camera module is in an inactive state. According to an embodiment of the disclosure, the first status bar display area 1251 may include an area 1265 of the display area 1280, which corresponds to the camera hole.

In the second status 1202, the electronic device may display a content in a second status bar display area 1252 and a third status bar display area 1253 of the display area 1280 as it identifies that the camera module is in an active state. According to an embodiment of the disclosure, the second status bar display area 1252 and the third status bar display area 1253 may not include the area 1265 of the display area 1280, which corresponds to the camera hole. For example, in the second status 1202, the electronic device may display a content in an area, except for the area 1265 corresponding to the camera hole.

According to an embodiment of the disclosure, the second status bar display area 1252 may be a left area of the area 1265 corresponding to the camera hole, and the third status bar display area 1253 may be a right area of the area 1265 corresponding to the camera hole.

According to an embodiment of the disclosure, the electronic device may divide at least one content that is to be displayed in the status bar display area and display the divided contents in the second status bar display area 1252 and the third status bar display area 1253.

According to an embodiment of the disclosure, when the area 1265 corresponding to the camera hole is inclined to the right side of the display area 1280, the size and/or the number of the contents that may be displayed in the third status bar display area 1252 may be smaller than the size and/or the number of the contents that are to be displayed in the second status bar display area 1252. According to an embodiment of the disclosure, when the area 1265 corresponding to the camera hole is inclined to the left side of the display area 1280, the size and/or the number of the contents that may be displayed in the second status bar display area 1252 may be smaller than the size and/or the number of the contents that are to be displayed in the third status bar display area 1253.

Hereinafter, a case, in which the area 1265 corresponding to the camera hole is inclined to the right side of the display area 1280, will be described as an assumption.

According to an embodiment of the disclosure, the electronic device may determine whether a content is to be displayed in the second status bar display area 1252 or in the third status bar display area 1253, based on the size of the content and/or the size of the status bar display area. Here, the size may mean a transverse width. For example, the electronic device may display, among the plurality of contents, contents, the sizes of which are smaller than the size of the third status bar display area 1253 and are closest to the size of the third status bar display area 1253, or a combination of the contents, in the third status bar display area 1253. The electronic device may display, among the at least one content configured to be displayed in the status bar display area, the remaining ones that are not displayed in the third status bar display area 1253, in the second status bar display area 1252.

According to an embodiment of the disclosure, in the electronic device, at least one content may be divided and disposed with respect to the area 1265 corresponding to the camera hole. Accordingly, a display area in an opposite direction to the direction, in which the camera hole is inclined, that is, the left area of the second status bar display area 1252 may be further used as the main display area.

Hereinafter, referring to FIG. 13, a method for changing a form of a content displayed in the status bar display area as the camera module (e.g., the camera module 180 of FIG. 1) becomes active, by an electronic device (e.g., the electronic device 401 of FIG. 4) according to an embodiment will be described. Operations of the electronic device, which will be described below, may be performed by the processor (e.g., the processor 420 of FIG. 4) of the electronic device.

FIG. 13 is a view 1300 illustrating a method for changing a form of a content when the camera module becomes active, by the electronic device according to an embodiment of the disclosure. Hereinafter, it is assumed that the content is a status bar icon.

A first status 1301 is a status, in which the camera module of the electronic device is inactive, and a second status 1302 and a third status 1303 are statuses, in which the camera module of the electronic device is active. The first status 1301 of FIG. 13 may correspond to the first status 1101 of FIG. 11 or the first status 1201 of FIG. 12, and the second status 1302 of FIG. 13 may correspond to the second status 1102 of FIG. 11 or the second status 1202 of FIG. 12.

In the first status 1301, the electronic device may display a content in a first status bar display area 1351 of a display area 1380 as it identifies that the camera module is in an inactive state. According to an embodiment of the disclosure, the first status bar display area 1351 may include an area 1365 of the display area 1380, which corresponds to the camera hole.

In the second status 1302, the electronic device may display a content in a second status bar display area 1352 and a third status bar display area 1353 of the display area 1380 as it identifies that the camera module is in an active state. According to an embodiment of the disclosure, the second status bar display area 1352 and the third status bar display area 1353 may not include the area 1365 of the display area 1380, which corresponds to the camera hole. For example, in the second status 1302, the electronic device may display a content in an area, except for the area 1365 corresponding to the camera hole.

According to an embodiment of the disclosure, the second status bar display area 1352 may be a left area of the area 1365 corresponding to the camera hole, and the third status bar display area 1353 may be a right area of the area 1365 corresponding to the camera hole.

According to an embodiment of the disclosure, the electronic device may divide at least one content that is to be displayed in the status bar display area and display the divided contents in the second status bar display area 1352 and the third status bar display area 1353.

According to an embodiment of the disclosure, the electronic device may determine whether a content is to be displayed in the second status bar display area 1352 or in the third status bar display area 1353, based on the size of the content and/or the size of the status bar display area. Here, the size may mean a transverse width.

For example, when the area 1265 corresponding to the camera hole is inclined to the right side of the display area 1280, the electronic device according to an embodiment of the disclosure may display, among the plurality of contents, contents, the sizes of which are smaller than the third status bar display area 1353 and are closest to the size of the third status bar display area 1353, or a combination of the contents, in the third status bar display area 1353. The electronic device may display, among the at least one content configured to be displayed in the status bar display area, the remaining ones that are not displayed in the third status bar display area 1353, in the second status bar display area 1252.

When, among the at least one content configured to be displayed in the status bar display area, a content, the size of which is smaller than the size of the third status bar display area 1353, is not present, the electronic device according to an embodiment may change a format of the at least one content configured to be displayed in the status bar display area such that the size of the at least one content is smaller than the size of the third status bar display area 1353. Here, the change in the form of the content may mean that a content of a form that is smaller than the size of the third status bar display area 1353 is selected from a content group including contents of various sizes and/or forms that represent the same information, which is stored in the memory (e.g., the memory 430 of FIG. 4) of the electronic device and is displayed.

Referring to FIG. 13, for example, the electronic device may display a status bar icon of a first form, in which a number (e.g., 100%) and an image (a battery image) are arranged side by side to provide battery residual charge information to the user in the first status 1301, and may display a status bar icon of a second form including only an image (a battery image) in the second status 1302. The size (transverse width) of the status bar icon of the second form may be smaller than that of the status bar icon of the first form. In other words, the status bar icon of the second form may be a simplified form of the status bar icon of the first form.

When, among the at least one content configured to be displayed in the status bar display area, a content, the size of which is smaller than the size of the third status bar display area 1353, is not present, the electronic device according to an embodiment may change the at least one content configured to be displayed in the status bar display area such that the size of the at least one content is smaller than the size of the third status bar display area 1353. For example, the at least one content set to a first size may be changed to a second size that is smaller than the second size to be displayed in the third status bar display area 1353. According to an embodiment of the disclosure, the electronic device may determine the size of the at least one content based on the size of the third status bar display area 1353 and/or a readability of the content, and may display the at least one content in the third status bar display area 1353 in the determined size. The readability of the content, for example, is a minimum size of the content that may be displayed on the electronic device and/or a specific value (e.g., a size) set by the user, and may mean a size, by which the at least one content may be recognized by the user.

According to an embodiment of the disclosure, the electronic device may determine, among a plurality of groups (e.g., first to n-th content groups 430-1 to 430-$n$ of FIG. 4), a content group corresponding to the size of the third status bar display area 1353, and may display the determined content group in the third status bar display area 1353. For example, in the first status 1301, the electronic device may sequentially display battery residual charge information included in the first content group 430-1 and time information included in the second content group 430-2 from the left side to the right side of the display area 1380 of the electronic device in the first status 1301, and in the second status 1302, may change the sequence of the displayed contents based on the size of the third status bar display area 1353. The electronic device, for example, may move the battery residual charge information of the first content group 430-1 corresponding to the size of the third status bar display area 1353 to the right side of the display area 1380 of the electronic device, and may display the time information included in the second content group 430-2 in the second status bar display area 1352, and the battery residual charge information included in the first content group 430-1 in the third status bar display area 1353.

According to an embodiment of the disclosure, when the display (e.g., the display 460 of FIG. 4) of the electronic device is in a rollable scheme, an area, in which the content is displayed, may be changed based on movement of the display. For example, when the display of the electronic device is moved (or expanded) in a positive (+) direction of the X axis (e.g., the X axis of FIG. 3), the third status bar display area 1353 may be changed (or expanded) in correspondence to a length, by which the first side (e.g., the first side 381 of FIG. 3) and/or the third side (e.g., the third side 383 of FIG. 3) is moved (or expanded), and at least one content may be displayed in the changed third status bar display area 1353'. For example, in the second status 1302, battery residual charge information of a second form (e.g., an image) may be displayed in the third status bar display area 1353, and in the third status 1303, in which the display is moved (or expanded), battery residual charge information of a first form (e.g., a number and an image) may be displayed in the changed third status bar display area 1353'.

Hereinafter, referring to FIG. 14, a method for displaying a content in a display 1460 (e.g., the display 460 of FIG. 4) as an always on display (AOD) function of the electronic device is executed, by the electronic device (e.g., the electronic device 401 of FIG. 4) according to an embodiment will be described. Operations of the electronic device, which will be described below, may be performed by the processor (e.g., the processor 420 of FIG. 4) of the electronic device. Hereinafter, it is assumed that the display 1460 of the electronic device according to an embodiment has a UDC structure.

Figure 14:
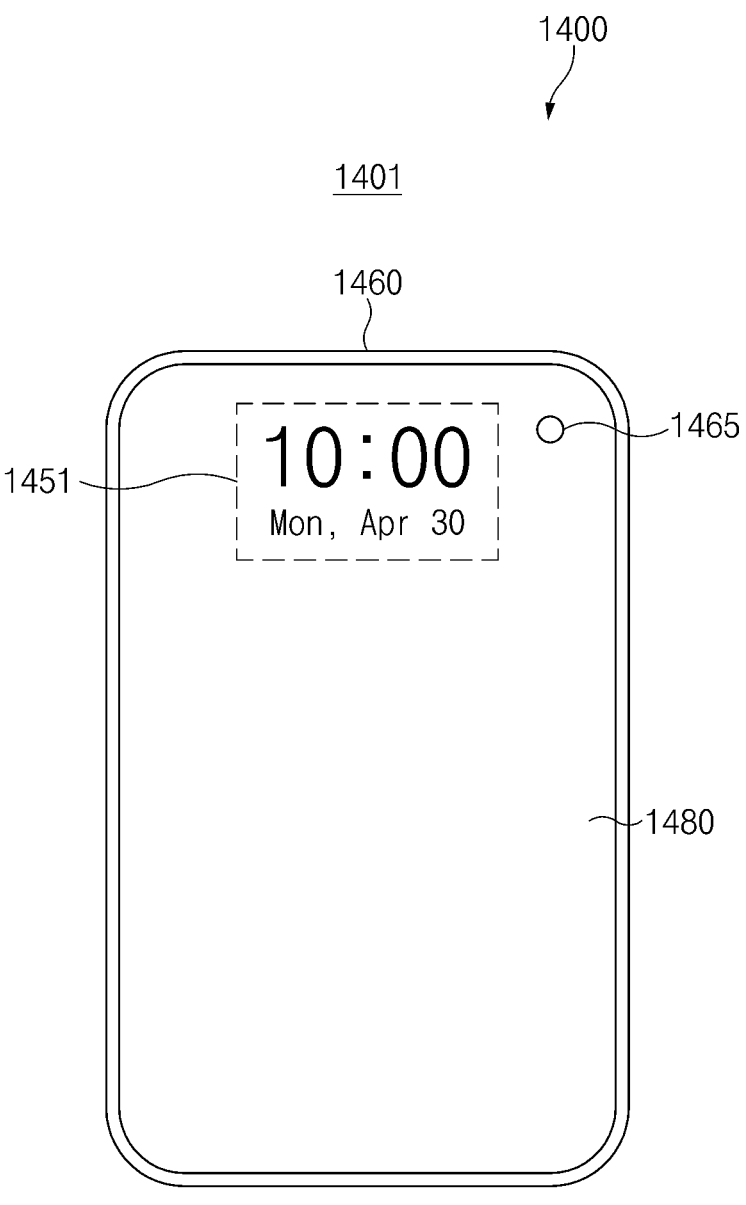
FIG. 14 is a view illustrating a method for displaying a content when a specific function is executed, by an electronic device according to an embodiment of the disclosure.

FIG. 14 is a view 1400 illustrating a method for displaying a content when a specific function is executed, by an electronic device according to an embodiment of the disclosure. For example, the specific function may include an always on display (AOD) function.

A first status 1401 may be in a status, in which the electronic device executes an always on display (AOD) function. The always on display (AOD) function is a function of displaying a content that represents information set by the user in a display area 1480 of the display 1460 even when a screen is not displayed in the display area 1480. The information set by the user, for example, may include at least one of a date, a time, a battery residual charge, or a notification.

According to an embodiment of the disclosure, the electronic device may execute an AOD function as an application processor becomes inactive. Then, the processor that executes the AOD function may be different from the application processor. For example, the processor that executes the AOD function may be an AOD dedicated chipset.

According to an embodiment of the disclosure, the electronic device may drive only a light emitting element of a display panel (e.g., the display panel 261 of FIG. 2) corresponding to an area of the display area 1380 as the AOD function is executed, and may display a content corresponding to information set by the user.

According to an embodiment of the disclosure, the electronic device may display the content in a first area 1451 as the AOD function is executed. According to an embodiment of the disclosure, the first area 1451 may be at least a portion of an area, except for an area 1465 corresponding to the camera hole.

According to an embodiment of the disclosure, when the display 1460 of the electronic device has a UDC structure, a pixel density of the area 1465 corresponding to the camera hole may be lower than that of other areas in the display area 1480, and a durability of the display may be low. Accordingly, it may be advantageous not to display a content in the area 1465 corresponding to the camera hole.

According to an embodiment of the disclosure, when the display 1460 of the electronic device has a UDC structure, degradation of a durability of the display of the area 1465 corresponding to the camera hole may be minimized by displaying a content in an area, except for the area 1465 corresponding to the camera hole.

Hereinafter, referring to FIGS. 15A and 15B, a method of controlling display of an object 1520 as a user input for moving the object 1520 displayed on a display 1560 (e.g., the display 460 of FIG. 4) is received by an electronic device (e.g., the electronic device 401 of FIG. 4) according to an embodiment will be described. Operations of the electronic device, which will be described below, may be performed by the processor (e.g., the processor 420 of FIG. 4) of the electronic device. Hereinafter, it is assumed that the display 1460 of the electronic device according to an embodiment has a through hole structure.

Figure 15A:
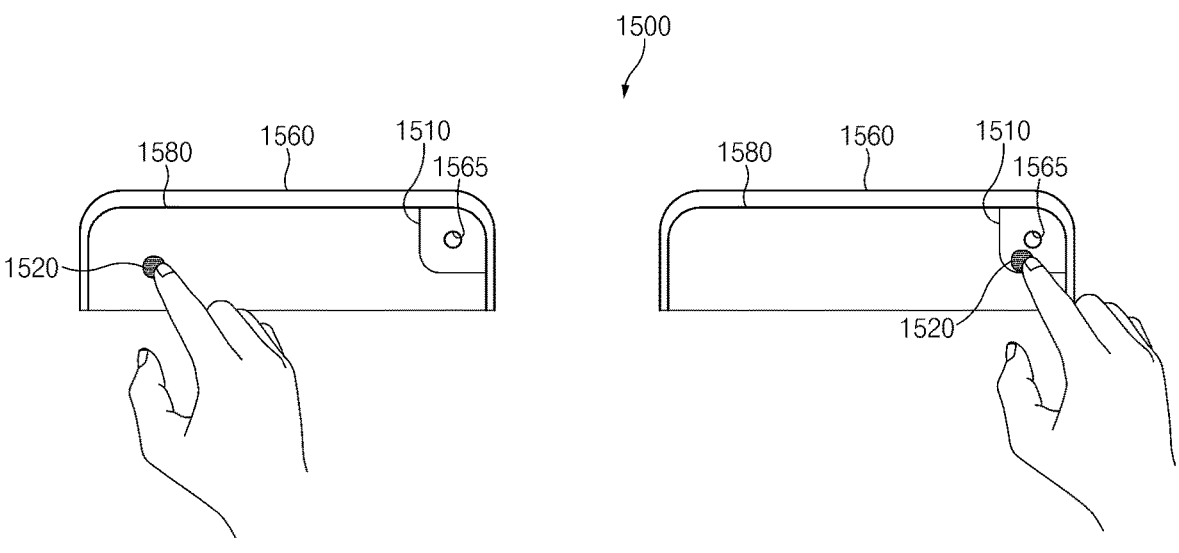
FIGS. 15A and 15B are view illustrating a method for controlling display of an object when receiving an input for moving an object displayed on a display, by an electronic device according to various embodiments of the disclosure.
Figure 15B:
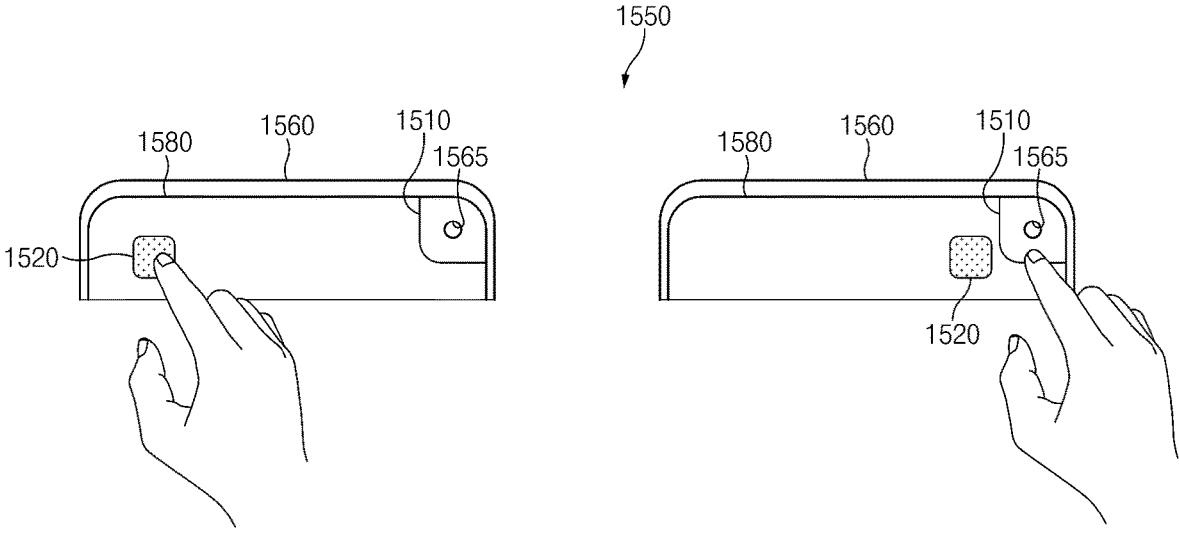

In the embodiment with reference to FIGS. 15A and 15B, an object may be a content other than a status bar icon, which is stored in the memory (e.g., the memory 430 of FIG. 4) to be displayed on the display 1560 of the electronic device. The object, for example, may be an icon or a widget that may execute an application.

FIGS. 15A and 15B are views (1500, 1550) illustrating a method for controlling display of an object when receiving an input for moving an object displayed on a display, by an electronic device according to various embodiments of the disclosure.

According to an embodiment of the disclosure, the electronic device may receive a user input for moving the object 1520 displayed in a display area 1580 of the display 1560. The user input for moving the object 1520, for example, may be a touch input, such as a drag-and-drop.

According to an embodiment of the disclosure, the user input may be an input for moving the object 1520 into a peripheral area 1510 of a camera hole 1565. The peripheral area 1510, for example, may be an area within a specific radius from a center of the camera hole 1565. Furthermore, when the camera hole 1565 is inclined to be close to, among four sides that constitute the display area 1580, at least one side, the area may mean an area within a specific distance from at least one side that is close to the camera hole 1565.

According to an embodiment of the disclosure, the electronic device may determine whether the object 1520 is to be displayed in the peripheral area 1510 based on the size of the object 1520.

Referring to FIG. 15A, the electronic device may display the object 1520 in the peripheral area 1510 as it receives an input for moving the object 1520 into the peripheral area 1510 when the size of the object 1520 is smaller than the size of the peripheral area 1510.

Referring to FIG. 15B, the electronic device may display the object 1520 in an outer area of the peripheral area 1510 as it receives an input for moving the object 1520 into the peripheral area 1510 when the size of the object 1520 is larger than the size of the peripheral area 1510.

According to an embodiment of the disclosure, a border of the peripheral area 1510 may be parallel to, among the sides of the display area 1580, two sides that are closest to the camera hole 1565. Meanwhile, the border of the peripheral area 1510 may be or may not be displayed on the display area 1580.

According to an embodiment of the disclosure, the electronic device may identify whether the size of the object 1520 is larger or smaller than the size of the peripheral area 1510 by comparing a transverse width or a longitudinal width of the object 1520 and a width between a border of the peripheral area 1510 and a border of the camera hole 1565.

For example, when the camera module (e.g., the camera module 180 of FIG. 1) of the electronic device becomes active, the light due to the display of the object 1520 enters the camera hole 1565 when the object 1520 is displayed in the peripheral area 1510 of the camera hole 1565, whereby the camera module may be hindered from obtaining a normal image. Furthermore, as the size of the object 1520 becomes larger, the amount of the light that enters the camera hole 1565 may be increased.

Accordingly, the electronic device according to an embodiment needs to limit whether the object 1520 is to be displayed in the peripheral area 1510 of the camera hole 1565 based on the size of the object 1520.

According to an embodiment disclosed in the disclosure, an electronic device (e.g., the electronic device 101 of FIG. 1, the electronic device 201 of FIG. 2, the electronic device 301 of FIG. 3, or the electronic device 401 of FIG. 4) includes a housing (e.g., the housing 210 of FIG. 2), a display (e.g., the display module 160 of FIG. 1, the display panel 261 of FIG. 2, the display 360 of FIG. 3, or the display 460 of FIG. 4), a display area (e.g., the display area 380 of FIG. 3) of which is exposed through the housing, and including a camera hole (e.g., the camera hole 265 of FIG. 2 or the camera hole 365 of FIG. 3), a camera module (e.g., the camera module 180 of FIG. 1 or the camera module 280 of FIG. 2) located between the display and the housing, and located to correspond to the camera hole, at least one processor (e.g., the processor 120 of FIG. 1 or the processor 420 of FIG. 4) operatively connected to the display and the camera module, and a memory (e.g., the memory 130 of FIG. 1 or the memory 430 of FIG. 4) operatively connected to the processor, and configured to store at least one content group (e.g., the first content group 430-1, the second to n-th content groups 430-2 to 430-n of FIG. 4) including at least one content, the memory may store instructions that, when executed, cause the processor to display the content in a first area (e.g., the area "D" 274 of FIG. 2 or the first area 310 of FIG. 3) of the display area when a size of the content is a first size, the first area is an area between a first tangent of the camera hole and a first side (e.g., the first side 381 of FIG. 3) of the display area, and the first side is one of four sides of the display area, which is closest to the first tangent while being parallel to the first tangent.

According to an embodiment disclosed in the disclosure, the instructions may cause the processor to set the first size based on a setting input by a user.

According to an embodiment disclosed in the disclosure, the instructions may cause the processor to display the content in the first area based on determining that the size of the content is smaller than the first area.

According to an embodiment disclosed in the disclosure, the instructions may cause the processor to display the content in a second area (e.g., the second area 320 of FIG. 3) of the display area based on identifying that a direction of the electronic device is changed, the second area may be an area between a second tangent of the camera hole and a second side (e.g., the second side 382 of FIG. 3) of the display area, the second side may be one of four sides of the display area, which is closest to the second tangent while being parallel to the second tangent, and the first tangent and the second tangent may be different.

According to an embodiment disclosed in the disclosure, the instructions may cause the processor to display the content in an area, except for an area corresponding to the camera hole.

According to an embodiment disclosed in the disclosure, the memory may store instructions that, when executed, cause the processor to display the content in an area corresponding to the camera hole. According to an embodiment disclosed in the disclosure, the instructions may cause the processor to display the content in an area corresponding to the camera hole when the camera module becomes inactive, and display the content in an area, except for the area corresponding to the camera hole, when the camera module becomes active.

According to an embodiment disclosed in the disclosure, the instructions may cause the processor to display the content in an area (e.g., the first area 1451 of FIG. 14), except for an area corresponding to the camera hole based on an always on display (AOD) function of the electronic device being executed.

According to an embodiment disclosed in the disclosure, the content may include a status bar icon.

According to an embodiment disclosed in the disclosure, the instructions may cause the processor to, in response to receiving a first user input for moving at least one object (e.g., the object 1520 of FIGS. 15A and 15B) displayed on the display area into the first area (e.g., the first area 1510), move the object into the first area to display the object based on determining that a size of the object is smaller than a size of the first area, and display the object outside the first area based on determining that the size of the object is equal to the size of the first area or larger than the size of the first area.

According to an embodiment disclosed in the disclosure, the instructions may cause the processor to identify a size and an aspect ratio of the display (e.g., the display 960 of FIGS. 9B to 9D), and determine an area, in which the content is to be displayed, based on the size and the aspect ratio of the display.

According to an embodiment disclosed in the disclosure, an electronic device (e.g., the electronic device 101 of FIG. 1, the electronic device 201 of FIG. 2, the electronic device 301 of FIG. 3, the electronic device 401 of FIG. 4, the electronic device 930 of FIG. 9B, the electronic device 950 of FIG. 9C, or the electronic device 970 of FIG. 9D) includes a housing (e.g., the housing 210 of FIG. 2), a display (e.g., the display module 160 of FIG. 1, the display panel 261 of FIG. 2, the display 360 of FIG. 3, the display 460 of FIG. 4, the display 960 of FIG. 9B, the display 960 of FIG. 9C, the display 960 of FIG. 9D), a display area (e.g., the display area 380 of FIG. 3, the display area 980 of FIG. 9B, the display area 980 of FIG. 9C, or the display area 980 of FIG. 9D) of which is exposed through the housing, and disposed to be movable, a camera module (e.g., the camera module 180 of FIG. 1 or the camera module 280 of FIG. 2) located between the display and the housing, at least one processor (e.g., the processor of FIG. 1 or the processor 420 of FIG. 4) operatively connected to the display and the camera module, and a memory (e.g., the memory 130 of FIG. 1 or the memory 430 of FIG. 4) operatively connected to the processor, and configured to store at least one content group (e.g., the first content group 430-1, the second to n-th content groups 430-2 to 430-n of FIG. 4) including at least one content, the memory may store instructions that, when executed, cause the processor to identify movement of the display, identify a size and a location of the display area, which are changed according to the movement of the display, and display the at least one content in a first area (e.g., the area "D" 274 of FIG. 2, the first area 310 of FIG. 3, the first status bar display area 9310 of FIG. 9B, the second status bar display area 9520 of FIG. 9C, or the second status bar display area 9720 of FIG. 9D), based on the changed size and location of the display area, the first area is an area between a first tangent of an area (e.g., the camera hole 265 of FIG. 2, the camera hole 365 of FIG. 3, the camera hole 965 of FIG. 9B, the camera hole 965 of FIG. 9C, or the camera hole 965 of FIG. 9D) corresponding to a location of the camera module and a first side (e.g., the first side 381 of FIG. 3, the first side 981 of FIG. 9B, the first side 981 of FIG. 9C, or the first side 981 of FIG. 9D) of the display area, and the first side is one of four sides of the display area, which is closest to the first tangent while being parallel to the first tangent.

According to an embodiment disclosed in the disclosure, the display area may be divided into a first display area, a size and a location of which are changed when the display is moved, and a second display area, a size and a location of which are fixed when the display is moved.

According to an embodiment disclosed in the disclosure, the memory may store instructions that, when executed, cause the processor to display the at least one content in an area of the display, which corresponds to the location of the camera module.

According to an embodiment disclosed in the disclosure, the instructions may cause the processor to display the at least one content in an area including an area corresponding to the location of the camera module when the camera module becomes inactive, and display the at least one content in an area, except for the area corresponding to the location of the camera module, when the camera module becomes active.

Hereinafter, referring to FIG. 16, a method for controlling an area, in which a content is displayed on a display (e.g., the display 460 of FIG. 4) based on a size of the content by an electronic device (e.g., the electronic device 401 of FIG. 4) according to an embodiment will be described. Operations of the electronic device, which will be described below, may be performed by the processor (e.g., the processor 420 of FIG. 4) of the electronic device.

Figure 16:
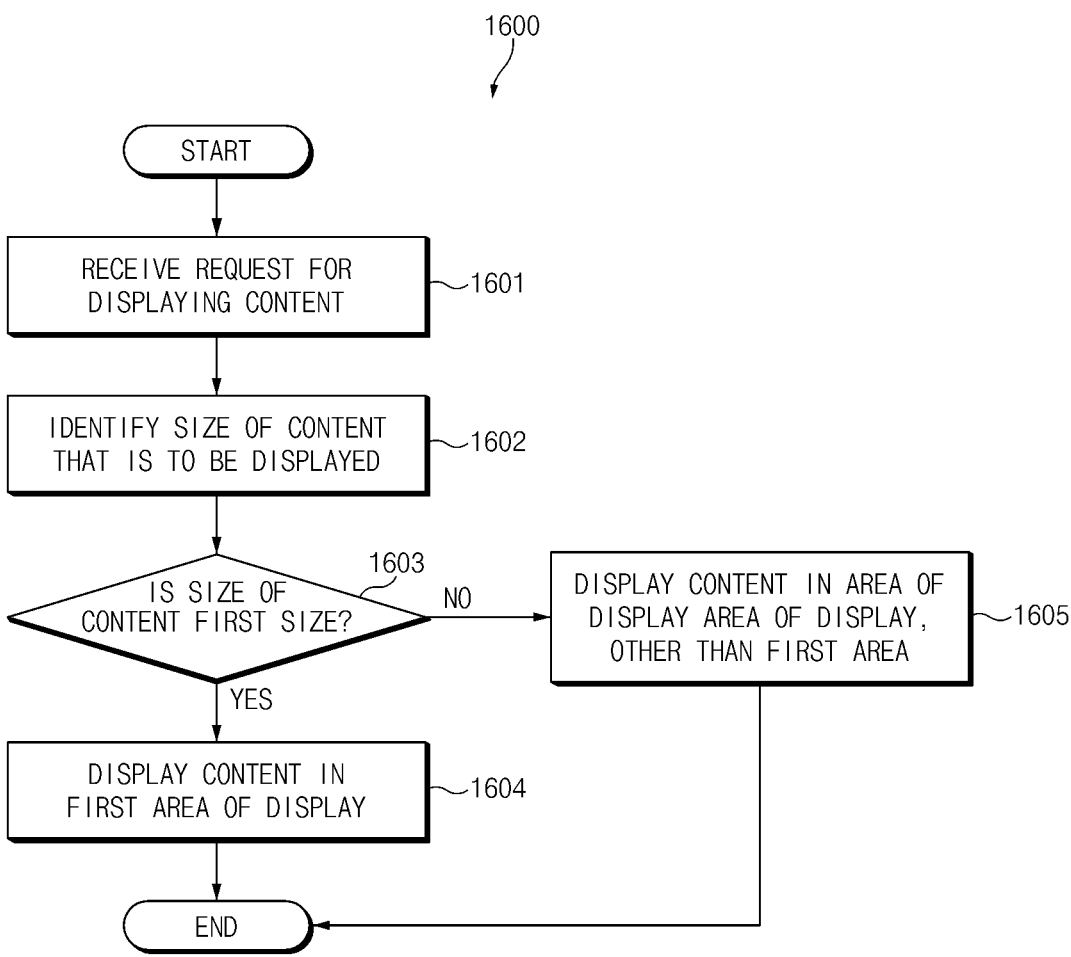
FIG. 16 is a flowchart illustrating a method for controlling a display of an electronic device according to an embodiment of the disclosure.

FIG. 16 is a flowchart 1600 illustrating a method for controlling a display of an electronic device according to an embodiment of the disclosure.

In operation 1601, the electronic device may receive a request for displaying a content. According to an embodiment of the disclosure, the content may be a status bar icon. According to an embodiment of the disclosure, the electronic device may receive a user input corresponding to a request for displaying the status bar icon. According to another embodiment of the disclosure, the electronic device may be configured to display the status bar icon when a power source is switched on. In other words, the electronic device may be configured to display the status bar icon except for when an event that is set such that the status bar icon is not displayed does not occur. The event set such that the status bar icon is not displayed, for example, may be an event, by which the camera module (e.g., the camera module 180 of FIG. 1) becomes active, or an event, by which a video is executed in a whole screen. The processor of the electronic device may receive a request for displaying the status bar icon or display the status bar icon based on default setting regarding the status bar icon.

In operation 1602, the electronic device may identify the size of the content that is to be displayed. According to an embodiment of the disclosure, the electronic device may store at least one content group (e.g., the first content group 430-1, the second content group 430-2, . . . , and the n-th content group 430-n) including at least one content in the memory (e.g., the memory 430 of FIG. 4). The content group may include contents of various sizes and/or various forms that represent the same information. According to an embodiment of the disclosure, the electronic device may select a content of a specific size from at least one content group stored in the memory and may display the selected content on the display. Accordingly, the electronic device according to an embodiment of the disclosure may identify the size of the content selected from the content group. According to an embodiment of the disclosure, operation 1602 may include operation 1603 of determining whether the size of the content is a first size.

In operation 1603, the electronic device may determine whether the size of the content is the first size. The first size may be a size that is set based on a setting input by the user. According to an embodiment of the disclosure, the setting input by the user may be an input for setting a size of a letter in a screen that is displayed by the electronic device. For example, when the user sets the size of the letter to, among "large" and "small", "small", the electronic device may display the content of the first size.

As it is determined that the size of the content is of the first size in operation 1603, the electronic device may display the content in the first area of the display (operation 1604), and as it is determined that the size of the content is not of the first size in operation 1603, the electronic device may display the content in an area of the display area of the display, other than the first area (operation 1605). Meanwhile, because the first area has been described above with reference to FIG. 4, a repeated description thereof will be omitted or simplified. According to an embodiment of the disclosure, a display area (e.g., the display area 380 of FIG. 3) of the display of the electronic device may be exposed through a first surface (e.g., the first surface 211 of FIG. 2) of the electronic device, and may include a camera hole (e.g., the camera hole 365 of FIG. 3). The electronic device may include the camera module (e.g., the camera module 180 of FIG. 1) at a location corresponding to the camera hole, in a space between the first surface and the second surface (e.g., the second surface 212 of FIG. 2) that is an opposite surface to the first surface.

According to an embodiment of the disclosure, the first area may be an area between the first tangent of the camera hole and the first side (e.g., the first side 381 of FIG. 3) of the display area of the display, and the first side may be, among four sides of the display area, a side that is closest to the first tangent while being substantially parallel to the first tangent.

According to an embodiment of the disclosure, the first size may be smaller than the size of the first area. According to an embodiment of the disclosure, as it is determined that the size of the content is smaller than the size of the first area in operation 1603, the electronic device may perform operation 1604. According to an embodiment of the disclosure, as it is determined that the size of the content is smaller than the size of the first area or larger than the size of the first area in operation 1603, the electronic device may perform operation 1605. Then, the first size may mean a height (a longitudinal width) of the content, and the size of the first area may mean a distance between the first tangent and the first side.

The electronic device according to an embodiment of the disclosure may display a status bar icon in an area between the camera hole and, among the two sides of the display area, which are substantially parallel to each other, a side that is close to the camera hole to provide a wider main display area.

According to an embodiment disclosed in the disclosure, a method for controlling a display of an electronic device (e.g., the electronic device 101 of FIG. 1, the electronic device 201 of FIG. 2, the electronic device 301 of FIG. 3, or the electronic device 401 of FIG. 4) including a display (e.g., the display module 160 of FIG. 1, the display module 261 of FIG. 2, the display 360 of FIG. 3, or the display 460 of FIG. 4) including a camera hole (e.g., the camera hole 265 of FIG. 2 or the camera hole 365 of FIG. 3) may include an operation of receiving a request for displaying a content on the display, an operation of identifying a size of the content, and an operation of displaying the content in any one of a first area (e.g., the area "D" 274 of FIG. 2 or the first area 310 of FIG. 3) or an area other than the first area, among a display area (e.g., the display area 380 of FIG. 3) of the display, based on the size of the content, the first area is an area between a first tangent of the camera hole and a first size (e.g., the first side 381 of FIG. 3) of the display area, and the first side may be, among the four sides of the display area, a side that is closest to the first tangent while being parallel to the first tangent.

According to an embodiment disclosed in the disclosure, the operation of displaying the content may include an operation of displaying the content in the first area when the content is of a first size.

According to an embodiment disclosed in the disclosure, the method may further include an operation of setting the first size based on a setting input by a user.

According to an embodiment disclosed in the disclosure, the operation of displaying the content may include an operation of displaying the content in the first area in response to determining that the size of the content is smaller than the first area (e.g., the second status bar display area 920 of FIG. 9A).

According to an embodiment disclosed in the disclosure, the method may include an operation of identifying a size and an aspect ratio of the display (e.g., the display 960 of FIGS. 9B to 9D), and an operation of determining whether the content is to be displayed in the first area (e.g., the first status bar display area 9310 of FIG. 9B, the second status bar display area 9520 of FIG. 9C, or the second status bar display area 9720 of FIG. 9D) based on the size and the aspect ratio of the display.

The electronic device according to various embodiments may be one of various types of electronic devices. The electronic devices may include, for example, a portable communication device (e.g., a smailphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic,"

"logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a housing;

a display including a display area exposed through the housing, and including a camera hole;

a camera module located between the display and the housing, and located to correspond to the camera hole;

memory configured to store instructions and at least one content group including at least one of at least one first content or at least one second content; and at least one processor operatively connected to the display, the camera module, and the memory, wherein the instructions, when executed by the at least one processor individually or collectively, cause the electronic device to:

display the at least one content group in a second format for displaying the at least one first content and the at least one second content, or display the at least one content group in a first format for displaying the at least one first content and the at least one second content, the first format being different than the second format, wherein in the first format, the at least one first content is displayed in a first area of the display area with a size of the at least one first content being a first size, wherein the first area is between a first tangent of the camera hole and a first side of the display area that is one of four sides of the display area, wherein the first tangent of the camera hole corresponds to a tangent of the camera hole that is closest and parallel to the first side of the display area, wherein in the first format, at least part of the at least one first content displayed in the first area is disposed between the camera hole and the first side of the display area, wherein the first side of the display area corresponds to a side of the display area that is an upper side of the display area among the upper side, a lower side, a right side, and a left side of the display area, wherein in the first format, at least part of the at least one second content is displayed between the camera hole and at least one of the right side or the left side of the display area, and wherein in the second format, both the at least one first content and the at least one second content are at least partially displayed between at least one of the camera hole and the right side of the display area or the camera hole and the left side of the display area, with the size of the at least one first content being a second size that is larger than the first size.

2. The electronic device of claim 1, wherein the instructions, when executed by the at least one processor individually or collectively, further cause the electronic device to:

set the size of the at least one first content based on a setting input by a user.

3. The electronic device of claim 1, wherein the instructions, when executed by the at least one processor individually or collectively, further cause the electronic device to:

display the at least one content group in the first format based on determining that the size of the at least one first content is smaller than the first area.

4. The electronic device of claim 3, wherein the instructions, when executed by the at least one processor individually or collectively, further cause the electronic device to:

display the at least one first content in a second area of the display area based on identifying that a direction of the electronic device is changed, wherein the second area is between a second tangent of the camera hole and a second side of the display area, wherein the second tangent of the camera hole corresponds to a tangent of the camera hole that is closest and parallel to the second side of the display area, and wherein the second side of the display area corresponds to the upper side of the display area after the direction of the electronic device is changed.

5. The electronic device of claim 1, wherein the instructions, when executed by the at least one processor individually or collectively, further cause the electronic device to:

display the at least one content group in in a third format for displaying the at least one first content and the at least one second content, with at least one of the at least one first content or the at least one second content at least in part being displayed in an area corresponding to the camera hole, wherein the third format is different than the first format and the second format.

6. The electronic device of claim 5, wherein the instructions, when executed by the at least one processor individually or collectively, further cause the electronic device to:

display the at least one content group in the third format when the camera module is inactive, and display the at least one content group in in the first format or the second format when the camera module is active.

7. The electronic device of claim 1, wherein the instructions, when executed by the at least one processor individually or collectively, further cause the electronic device to:

display the at least one content group in in a fourth format for displaying the at least one of the at least one first content or the at least one second content, based on an always on display (AOD) function of the electronic device being executed, wherein the fourth format is different than the first format and the second format, and wherein in the fourth format, no part of the at least one of the at least one first content or the at least one second content is displayed in an area corresponding to the camera hole.

8. The electronic device of claim 1, wherein the at least one of the at least one first content or the at least one second content includes a status bar icon.

9. The electronic device of claim 1, wherein the instructions, when executed by the at least one processor individually or collectively, further cause the electronic device to:

in response to receiving a first user input for moving at least one object displayed on the display area into the first area, move the object into the first area to display the object based on determining that a size of the object is smaller than a size of the first area, and display the object outside the first area based on determining that the size of the object is equal to the size of the first area or larger than the size of the first area.

10. The electronic device of claim 1, wherein the instructions, when executed by the at least one processor individually or collectively, further cause the electronic device to:

identify a size and an aspect ratio of the display, and determine an area, in which-whether the at least one first content is to be displayed, displayed in the first area based on the size and the aspect ratio of the display.

11. The electronic device of claim 1,
wherein the at least one first content includes a status bar icon, and
wherein the at least one second content includes time information.

12. An electronic device comprising:
a housing;
a display including a display area exposed through the housing, and including a camera hole;
a camera module located between the display and the housing, and located to correspond to the camera hole;
memory configured to store instructions and at least one content group including at least one content; and
at least one processor operatively connected to the display, the camera module, and the memory,
wherein the instructions, when executed by the at least one processor individually or collectively, cause the electronic device to:
display the at least one content in a first area, based on the display area being in a first orientation,
identify movement of the display,
identify a changed orientation of the display area from the first orientation to a second orientation according to the movement of the display, and
display the at least one content in a second area, based on the display area being in the second orientation,
wherein the first area is between a first tangent of the camera hole and a first side of the display area that is one of four sides of the display area,
wherein the first tangent of the camera hole corresponds to a tangent of the camera hole that is closest and parallel to the first side of the display area,
wherein at least part of at least one content displayed in the first area is disposed between the camera hole and the first side of the display area,
wherein the first side of the display area corresponds to a side of the display area in the first orientation that is an upper side of the display area among the upper side, a lower side, a right side, and a left side of the display area in the first orientation,
wherein the second area is between a second tangent of the camera hole and a second side of the display area that is one of the four sides of the display area,
wherein the second tangent of the camera hole corresponds to a tangent of the camera hole that is closest and parallel to the second side of the display area,
wherein at least part of at least one content displayed in the second area is disposed between the camera hole and the second side of the display area,
wherein the second side of the display area corresponds to a side of the display area in the second orientation that is an upper side of the display area among the upper side, a lower side, a right side, and a left side of the display area in the second orientation, and
wherein the first orientation is one of a portrait orientation or a landscape orientation and the second orientation is the other one of the portrait orientation or the landscape orientation.

13. The electronic device of claim 12,
wherein a size of the first area and the second area are the same.

14. The electronic device of claim 12, wherein the instructions, when executed by the at least one processor individually or collectively, further cause the electronic device to:
display the at least one content in an area of the display, which corresponds to a location of the camera module.

15. The electronic device of claim 14, wherein the instructions, when executed by the at least one processor individually or collectively, further cause the electronic device to:
display the at least one content in the area corresponding to the camera hole when the camera module is inactive, and
display the at least one content in another area, except for the area corresponding to the camera hole, when the camera module is active.

16. A method performed by an electronic device including a display including a display area that includes a camera hole, the method comprising:
displaying at least one content group, including at least one of at least one first content or at least one second content, in a second format for displaying the at least one first content and the at least one second content; and
displaying the at least one content group in a first format for displaying the at least one first content and the at least one second content, the first format being different than the second format,
wherein in the first format, the at least one first content is displayed in a first area of the display area with a size of the at least one first content being a first size,
wherein the first area is between a first tangent of the camera hole and a first side of the display area that is one of four sides of the display area,
wherein the first tangent of the camera hole corresponds to a tangent of the camera hole that is closest and parallel to the first side of the display area,
wherein in the first format, at least part of the at least one first content displayed in the first area is disposed between the camera hole and the first side of the display area,
wherein the first side of the display area corresponds to a side of the display area that is an upper side of the display area among the upper side, a lower side, a right side, and a left side of the display area,
wherein in the first format, at least part of the at least one second content is displayed between the camera hole and at least one of the right side or the left side of the display area, and
wherein in the second format, both the at least one first content and the at least one second content are at least partially displayed between at least one of the camera hole and the right side of the display area or the camera hole and the left side of the display area, with the size of the at least one first content being a second size that is larger than the first size.

17. The method of claim 16, further comprising:
setting the size of the at least one first content based on a setting input by a user.

18. The method of claim 16, wherein the displaying of the at least one content group in the first format comprises:
displaying the at least one content group in the first format based on determining that the size of the at least one first content is smaller than the first area.

19. The method of claim 16, further comprising:
identifying a size and an aspect ratio of the display; and
determining whether the at least one first content is to be displayed in the first area based on the size and the aspect ratio of the display.

20. The method of claim 16, wherein the at least one first content includes a status bar icon, and wherein the at least one second content includes time information.

\* \* \* \* \*